US010785709B2

(12) United States Patent
Hirata et al.

(10) Patent No.: US 10,785,709 B2
(45) Date of Patent: Sep. 22, 2020

(54) BASE STATION DEVICE, TERMINAL DEVICE, AND COMMUNICATION SYSTEM FOR DIVIDING RESOURCES TO ESTABLISH CONNECTION

(71) Applicant: FUJITSU LIMITED, Kawasaki-shi, Kanagawa (JP)

(72) Inventors: Akira Hirata, Yokohama (JP); Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/353,511

(22) Filed: Mar. 14, 2019

(65) Prior Publication Data

US 2019/0215761 A1 Jul. 11, 2019

Related U.S. Application Data

(63) Continuation of application No. PCT/JP2016/078952, filed on Sep. 29, 2016.

(51) Int. Cl.
*H04W 48/14* (2009.01)
*H04L 5/00* (2006.01)
(Continued)

(52) U.S. Cl.
CPC ........... *H04W 48/14* (2013.01); *H04L 5/0092* (2013.01); *H04W 8/005* (2013.01); *H04W 36/38* (2013.01);
(Continued)

(58) Field of Classification Search
CPC ... H04W 36/38; H04W 36/385; H04W 48/14; H04W 48/16; H04W 48/17; H04W 48/18;
(Continued)

(56) References Cited

U.S. PATENT DOCUMENTS

| 2015/0271835 | A1 | 9/2015 | Shaw |
| 2016/0112943 | A1* | 4/2016 | Horn ..................... H04W 48/20 370/329 |

(Continued)

FOREIGN PATENT DOCUMENTS

| JP | 2013-157699 A | 8/2013 |
| JP | 2016-39531 A | 3/2016 |
| WO | 2013/111843 A1 | 8/2013 |

OTHER PUBLICATIONS

Ericsson, "RAN support for network slicing", Agenda Item: 9.5.1, 3GPP TSG-RAN WG2 Meeting #93bis, R2-162758, Dubrovnik, Croatia, Apr. 11-15, 2016.

(Continued)

*Primary Examiner* — Mewale A Ambaye
(74) *Attorney, Agent, or Firm* — Myers Wolin, LLC

(57) ABSTRACT

A base station device has a transmitter and a receiver. The transmitter transmits reporting information including information of divided resources, information of connection modes used when connecting to the divided resources, and information for identifying services associated with the divided resources. Here, the divided resources are obtained by dividing resources in association with services provided via a core network. The receiver receives, from a terminal that has received the reporting information, a connection request that specifies a certain connection mode to be used for connection.

5 Claims, 20 Drawing Sheets

(51) Int. Cl.
*H04W 48/16* (2009.01)
*H04W 8/00* (2009.01)
*H04W 76/15* (2018.01)
*H04W 48/00* (2009.01)
*H04W 72/08* (2009.01)
*H04W 88/06* (2009.01)
*H04W 88/10* (2009.01)
*H04W 36/38* (2009.01)
*H04W 76/10* (2018.01)
*H04W 48/18* (2009.01)
*H04W 92/10* (2009.01)

(52) U.S. Cl.
CPC ......... *H04W 36/385* (2013.01); *H04W 48/16* (2013.01); *H04W 48/17* (2013.01); *H04W 48/18* (2013.01); *H04W 72/085* (2013.01); *H04W 76/10* (2018.02); *H04W 76/15* (2018.02); *H04W 88/06* (2013.01); *H04W 88/10* (2013.01); *H04W 92/10* (2013.01)

(58) Field of Classification Search
CPC ... H04W 72/085; H04W 76/10; H04W 76/12; H04W 76/15; H04W 88/06; H04W 88/10; H04W 88/005
See application file for complete search history.

(56) References Cited

U.S. PATENT DOCUMENTS

| | | | | |
|---|---|---|---|---|
| 2017/0135099 | A1* | 5/2017 | Song | H04W 16/02 |
| 2018/0192426 | A1* | 7/2018 | Ryoo | H04W 24/10 |
| 2019/0029065 | A1* | 1/2019 | Park | H04W 76/18 |
| 2019/0098691 | A1* | 3/2019 | Yu | H04W 12/06 |
| 2019/0357131 | A1* | 11/2019 | Sivavakeesar | H04W 36/0016 |

OTHER PUBLICATIONS

Catt, "Network slicing in 5G NR", Agenda Item: 9.5.1, 3GPP TSG-RAN WG2 Meeting #93bis, R2-162569, Dubrovnik, Croatia, Apr. 11-15, 2016.

NTT Docomo, Inc., "Update of TR 38.801 (v010)", Agenda Item: 10.1.1, 3GPP TSG-RAN WG3 Meeting #91bis, R3-160947, Bangalore, India, Apr. 11-15, 2016.

International Search Report issued by the Japan Patent Office for corresponding International Patent Application No. PCT/JP2016/078952, dated Dec. 6, 2016.

Written Opinion of the International Searching Authority issued by the Japan Patent Office for corresponding International Patent Application No. PCT/JP2016/078952, dated Dec. 6, 2016, with an English translation.

Japanese Office Action dated Jun. 16, 2020 for corresponding Japanese Patent Application No. 2018-541822, with English Translation.

Nokia, Alcatel-Lucent Shanghai Bell,"Key principles for Slice Selection Support in RAN", 3GPP TSG-RAN WG3 Meeting #91bis, Bangalore, India, Apr. 11-15, 2016, R3-160735; Cited in JPOA dated Jun. 16, 2020 for corresponding Japanese Patent Application No. 2018-541822.

Qualcomm Incorporated,"Solution for key issue 17 on Network Discovery and Selection in idle mode", SA WG2 Meeting #116, Vienna, Austria, Jul. 11-15, 2016, S2-163390; Cited in JPOA dated Jun. 16, 2020 for corresponding Japanese Patent Application No. 2018-541822.

* cited by examiner

| CHARACTERISTICS | OFFSET |
|---|---|
| SLICE1 | 0 |
| SLICE2 | −10dbm |
| SLICE3 | −50dbm |

T2

| CHARACTERISTICS | EVENT | ADJACENT CELL |
|---|---|---|
| SLICE1 | HANDOVER TO ADJACENT CELL IS DIFFICULT (THRESHOLD POWER BEING REPORT CONDITION OF ADJACENT CELL IS VERY HIGH) | B |
| SLICE2 | NORMAL | |
| SLICE3 | HANDOVER TO ADJACENT CELL IS EASY (THRESHOLD POWER BEING REPORT CONDITION OF ADJACENT CELL IS VERY LOW) | |

BASE STATION DEVICE, TERMINAL DEVICE, AND COMMUNICATION SYSTEM FOR DIVIDING RESOURCES TO ESTABLISH CONNECTION

CROSS-REFERENCE TO RELATED APPLICATIONS

This application is a continuation application of International Application PCT/JP2016/078952 filed on Sep. 29, 2016 and designated the U.S., the entire contents of which are incorporated herein by reference.

FIELD

The embodiments discussed herein relate to a base station device, a terminal device, a communication system, and a communication method.

BACKGROUND

In 5G mobile network, studies have been made on the architecture of network slicing for allocating resources of a wired network and/or a wireless network according to the service that a terminal (User Equipment, UE) wishes to receive. For example, in the case of applying the network slicing to a wireless network, optimization of resources of the RAN (Radio Access Network) has been proposed, such as the frequency spectrum, the power, the antenna, and so on. Meanwhile, a plurality of slices exist in a network, and therefore, the ability to control traffic and/or QoS (Quality of Service) according to each slice has been proposed as one of desirable conditions. For example, it is also required that each slice may be monitored by means of PM (Performance Management) and/or KPI (Key Performance Indicator). In addition, it is preferable that the influence that CM (Configuration Management) and/or FM (Fault Management) performed for each slice has on the entire network may be controlled as well. Furthermore, a proposal has also been made for not affecting the service provided by another slice in order to make up for the lack of resources for one slice, and the like, as a desirable character for applying the network slicing.

For example, the following document has been known. "RAN support for network slicing" 3GPP TSG-RAN WG2 #93bis Tdoc R2-162758 [online], Apr. 11, 2016, [retrieved on Sep. 23, 2016], Internet <URL:http://www.3gpp.org/ftp/TSG_RAN/WG2_RL2/TSGR2_93bis/Docs/>

Although the network slicing is applied to a wireless network, the base station does not recognize the service that the terminal is going to use, and the communication quality suitable for the service that the terminal is going to user. For this reason, the communication quality may deteriorate because the base station fails due to a failure to establish a connection that is suitable for the service that the terminal is going to use.

SUMMARY

According to an aspect of the embodiments, a base station device has a transmitter and a receiver. The transmitter transmits reporting information including information of divided resources, information of connection modes used when connecting to the divided resources, and information for identifying services associated with the divided resources. Here, the divided resources are obtained by dividing resources in association with services provided via a core network. The receiver receives, from a terminal that has received the reporting information, a connection request that specifies a certain connection mode to be used for connection.

The object and advantages of the invention will be realized and attained by means of the elements and combinations particularly pointed out in the claims.

It is to be understood that both the foregoing general description and the following detailed description are exemplary and explanatory and are Not restrictive of the invention.

BRIEF DESCRIPTION OF DRAWINGS

FIG. 19 is a diagram illustrating an example of information used in the third embodiment.

DESCRIPTION OF EMBODIMENTS

Figure 1:
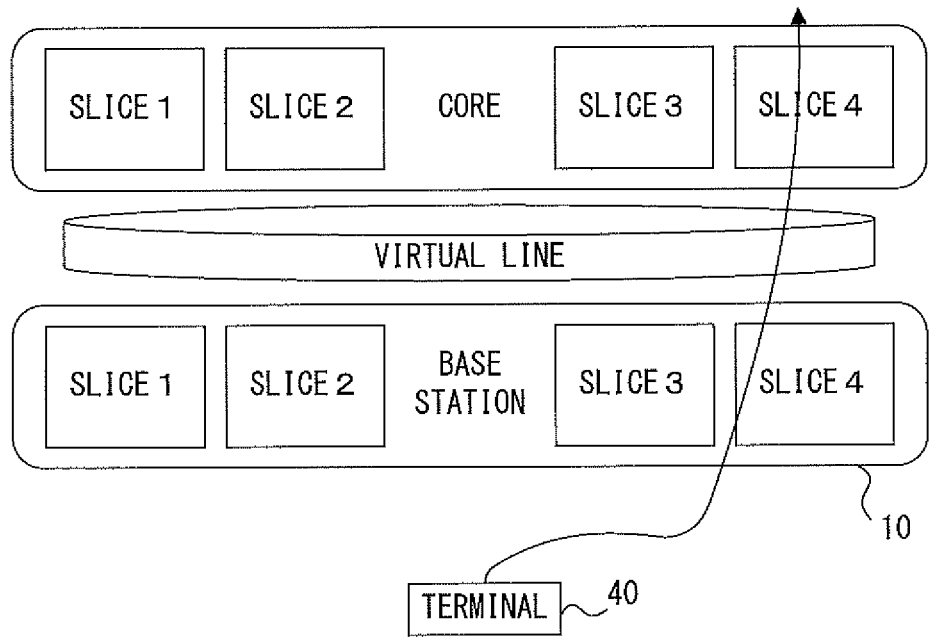
FIG. 1 is a diagram illustrating an example of a system to which the communication according to an embodiment is applied.

FIG. 1 is a diagram illustrating an example of a system to which the communication according to an embodiment is applied. In the system to which the communication according to an embodiment is applied, the network slicing is applied to both a core network and a wireless network. In the example in FIG. 1, the core network and the wireless network are both divided into a slice 1 through a slice 4. In accordance with the network slices set in the core network and the wireless network, in a base station 10, resources used for the connection processing at the base station 10 are also divided into a slice 1 through a slice 4. Here, the resources divided in the base station 10 may be, for example, the frequency spectrum, the power, the antenna, and so on. Meanwhile, each of the slices set in the based station 10 may be referred to as a "divided resource" as it is a part obtained by dividing the resources held by the base station 10. A slice set in the base station 10 is assumed to provide connection with a communication quality that is suitable for communication with the slice assigned with the same number among the slices set in the core network. For example, the slice 1 in the base station 10 provides connection that is suitable for the service provided via the slice 1 of the core network. In the example in FIG. 1, a terminal 40 connects to the base station 10 using the resources of the slice 4 of the base station 10 to access the slice 4 of in the core network.

Figure 2:
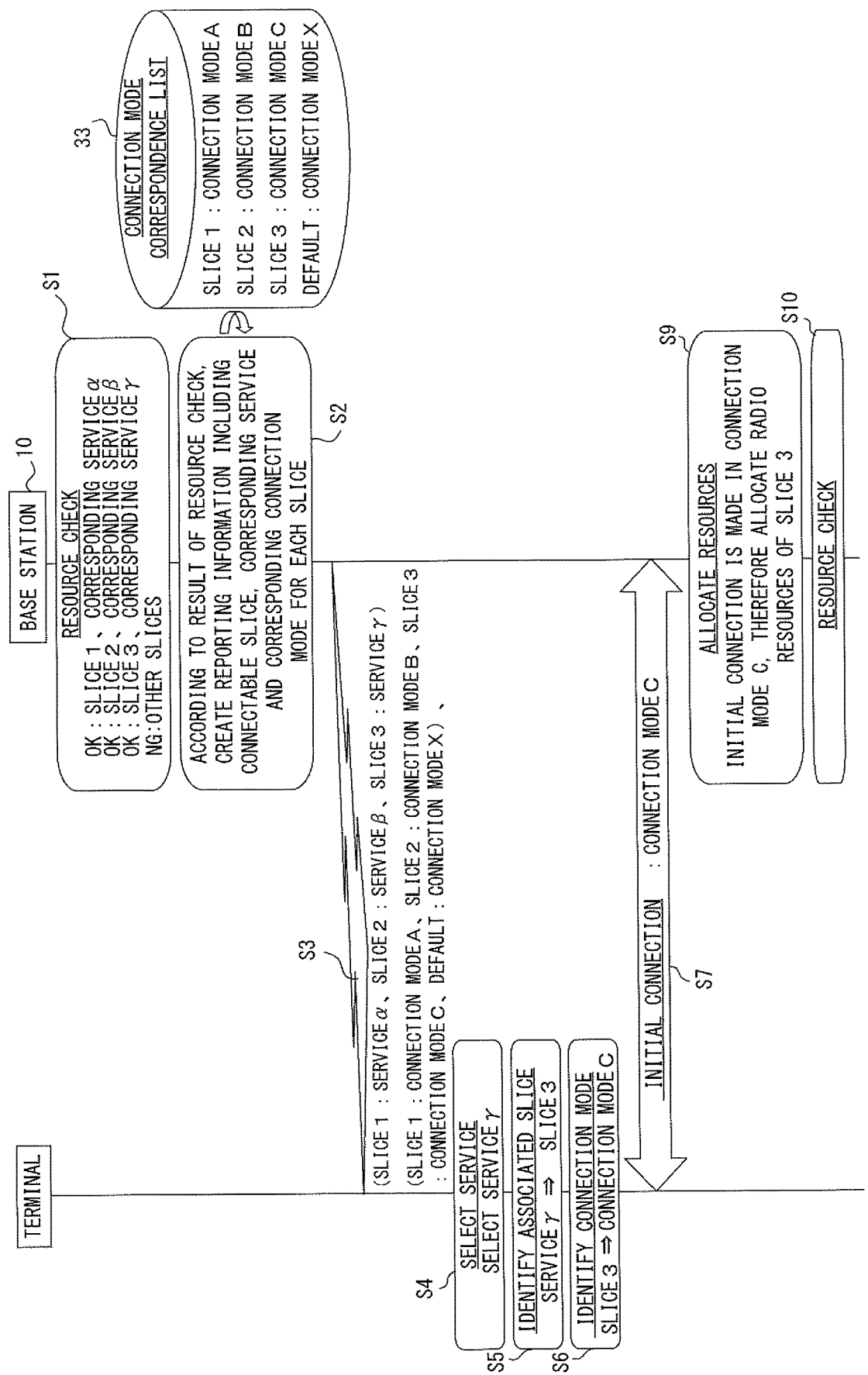
FIG. 2 is a sequence diagram illustrating an example of a communication method according to an embodiment.

FIG. 2 is a sequence diagram illustrating an example of a communication method according to an embodiment. In the system performing the communication illustrated in FIG. 2, the base station 10 has stored in advance the services provided by the slices on the core-network side for which the respective slices provide suitable communication and the communication methods used for the connection between the respective slices and the terminal 40.

In Step S1, the base station 10 determines whether the connection of anew terminal 40 may be allowed using each of the slices, by checking the resources of the base station 10 for each slice. In the example of Step S1, it is possible for the slice 1 through the slice 3 to connect a new terminal 40, but resources are not left for the slice 4 to establish a new connection. In addition, it is assumed that the slice 1 has a communication quality that is suitable for providing a service α. In a similar manner, it is assumed that the slice 2 is a communication quality that has suitable for providing a service β, and that the slice 3 has a communication quality that is suitable for providing a service γ. Further, the base station 10 identifies the connection mode for each of the slices, using information stored in advance. In the example in FIG. 2, the base station 10 has stored a connection mode correspondence list 33. In the connection mode correspondence list 33, it has been recorded that for the connection to the slice 1, a connection mode A is to be used, for the connection to the slice 2, a connection mode B is to be used, and for the connection to the slice 3, a connection mode C is to be used. In addition, it has been recorded that, for a terminal 40 for which no particular slice is to be specified (connected by default), a connection mode X is to be used. Using the result of the resource check, the base station 10 creates reporting information that includes, for each slice to which a new terminal 40 can be connected, a corresponding service and connection mode (Step S2). The base station 10 reports the generated reporting information (Step S3). Accordingly, by the reporting information, the service α and the connection mode A are reported in association with the slice 1, and the service β and the connection mode B are reported in association with the slice 2. Further, the service γ and the connection mode C are reported in association with the slice 3, and it is also reported that a terminal (default) without specifying any slice may use the connection mode X. The terminal 40 stores the information reported by the reporting information.

The terminal 40 selects the service to be used, according to processing by the user, the setting conditions, and so on (Step S4). In the example in FIG. 2, it is assumed that the terminal 40 selects the service γ. The terminal 40 identifies the slice associated with the selected service, using the reporting information (Step S5). In the example in FIG. 2, the terminal 40 identifies that the service γ is associated with the slice 3. Next, the terminal 40 identifies the connection mode associated with the identified slice, using the reporting information (Step S6). In the example in FIG. 2, an attempt is being made to connect to the slice 3, therefore, the terminal 40 identifies that the connection mode C is available. The terminal 40 performs initial connection to the base station 10 using the connection mode C (Step S7).

The terminal 40 allocates, to the terminal 40, the resources of the slice associated with the mode of the initial connection (Step S8). The initial connection in Step S7 was performed in the connection mode C, and therefore, the base station 10 allocates resources of the slice 3 to the terminal 40 (Step S9). After that, the base station 10 performs a resource check (Step S10). Meanwhile, the usage condition of the resources has been changed according to the allocation of resources to the terminal 40, and therefore, the process of Step S10 updates the usage condition of the resources.

As described above, in the method according to an embodiment, the base station 10 reports the service and the connection method for each slice, to the terminal 40, using reporting information. In addition, the terminal 40 accesses the base station 10 using the connection method associated with the slice that provides the service to be used, and accordingly, the base station 10 is able to perform the connection process using a slice that is suitable for the service used by the terminal 40. Therefore, the base station 10 is able to recognize the quality of the connection that the terminal 40 is going to use, from the connection quality in the slice associated with the connection method. Accordingly, the base station 10 is able to allocate the slice that matches the communication quality to be used by the terminal 40, to avoid degradation of the communication quality due to a connection made to a slice that the terminal 40 is not going to connect to.

<Device Configuration>

Figure 3:
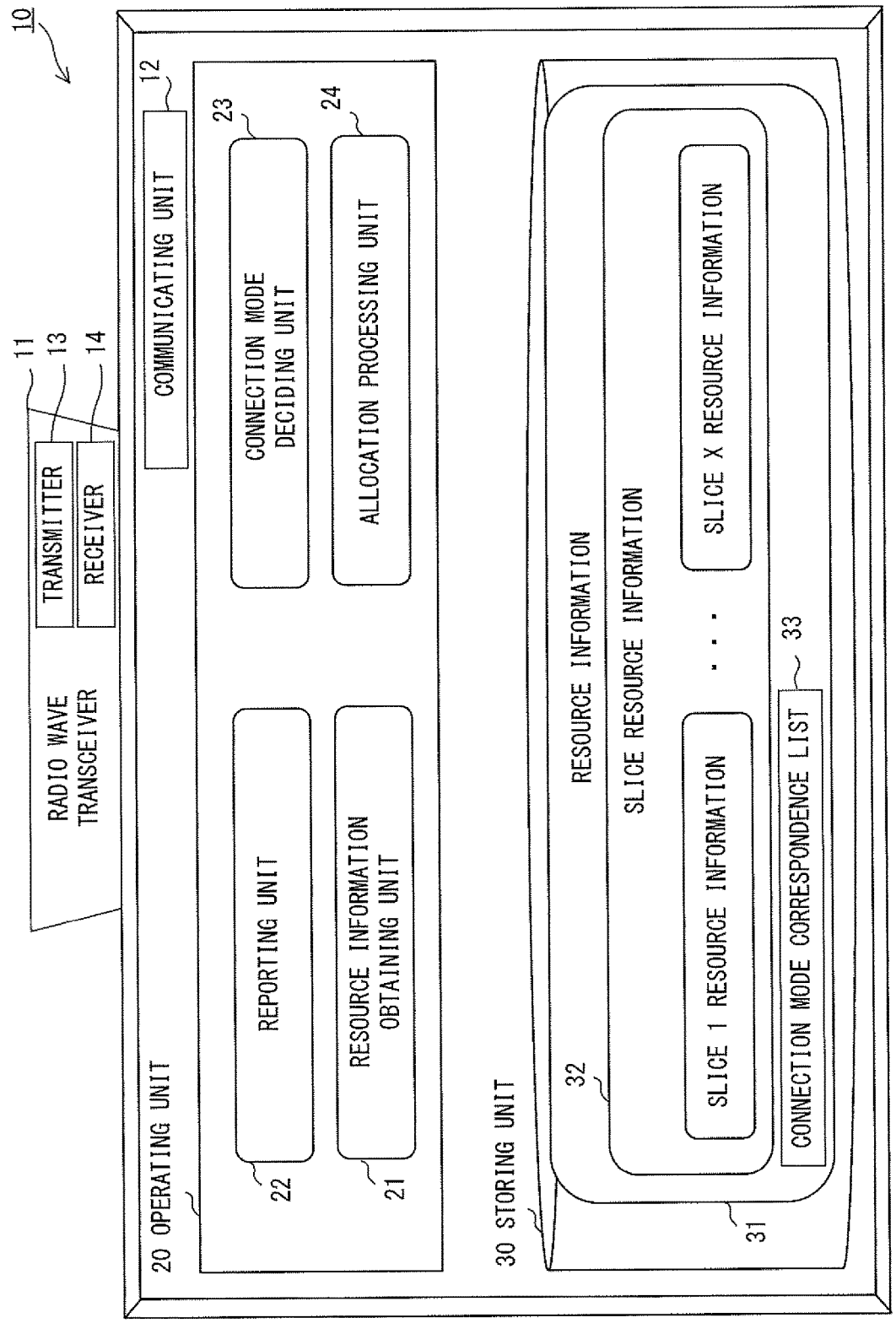
FIG. 3 is a diagram illustrating an example of a configuration of a base station.

FIG. 3 is a diagram illustrating an example of the configuration of the base station 10. The base station 10 has a radio wave transceiver 11, a communicating unit 12, an operating unit 20, and a storing unit 30. The operating unit 20 has a resource information obtaining unit 21, a reporting unit 22, a connection mode deciding unit 23, and an allocation processing unit 24. The storing unit 30 stores resource information 31. The resource information 31 includes slice resource information 32 and the connection mode correspondence list 33.

The radio wave transceiver 11 has a transmitter 13 and a receiver 14. The transmitter 13 performs the transmitting process for signals, and the receiver 14 performs the receiving process for signals. The communicating unit 12 performs the communication process with other base stations 10, as well as the communication process with devices in the core network. The resource information obtaining unit 21 regularly checks the usage condition of the resources held by the base station 10 for each slice and records the obtained result as the slice resource information 32. The usage condition of the resources may also be recorded in the slice resource information 32 as the result of determination as to whether connection of a new terminal 40 may be allowed. The reporting unit 22 determines whether or not to change the content of the reporting information, using the result obtained by the resource information obtaining unit 21. For example, when depletion of resources occurs in a slice, the reporting unit 22 deletes, from the reporting information, the mode of connection to the slice as well as the information of the service associated with the slice. Meanwhile, the reporting unit 22 may also determine whether any reason for changing the reporting information has been generated, by regularly accessing the resource information obtaining unit 21 and/or the storing unit 30. In addition, the resource information obtaining unit 21 may notify the reporting unit 22 of the generation of a reason for changing the reporting information, and upon receiving the notification from the resource information obtaining unit 21, the reporting unit 22 may change the reporting information.

Upon receiving a connection request from the terminal 40 via the receiver 14, the connection mode deciding unit 23 determines the slice to which the terminal 40 is going to connect to, according to the requested mode of connection. At this time, the connection mode deciding unit 23 uses the connection mode correspondence list 33. An example of the connection mode correspondence list 33 is presented in FIG. 2. The connection mode deciding unit 23 requests the allocation processing unit 24 to allocate the resources divided as the slice to which the terminal 40 is going to connect. The allocation processing unit 24 performs the process of allocating the resources and also establishes connection with the terminal 40.

Figure 4:
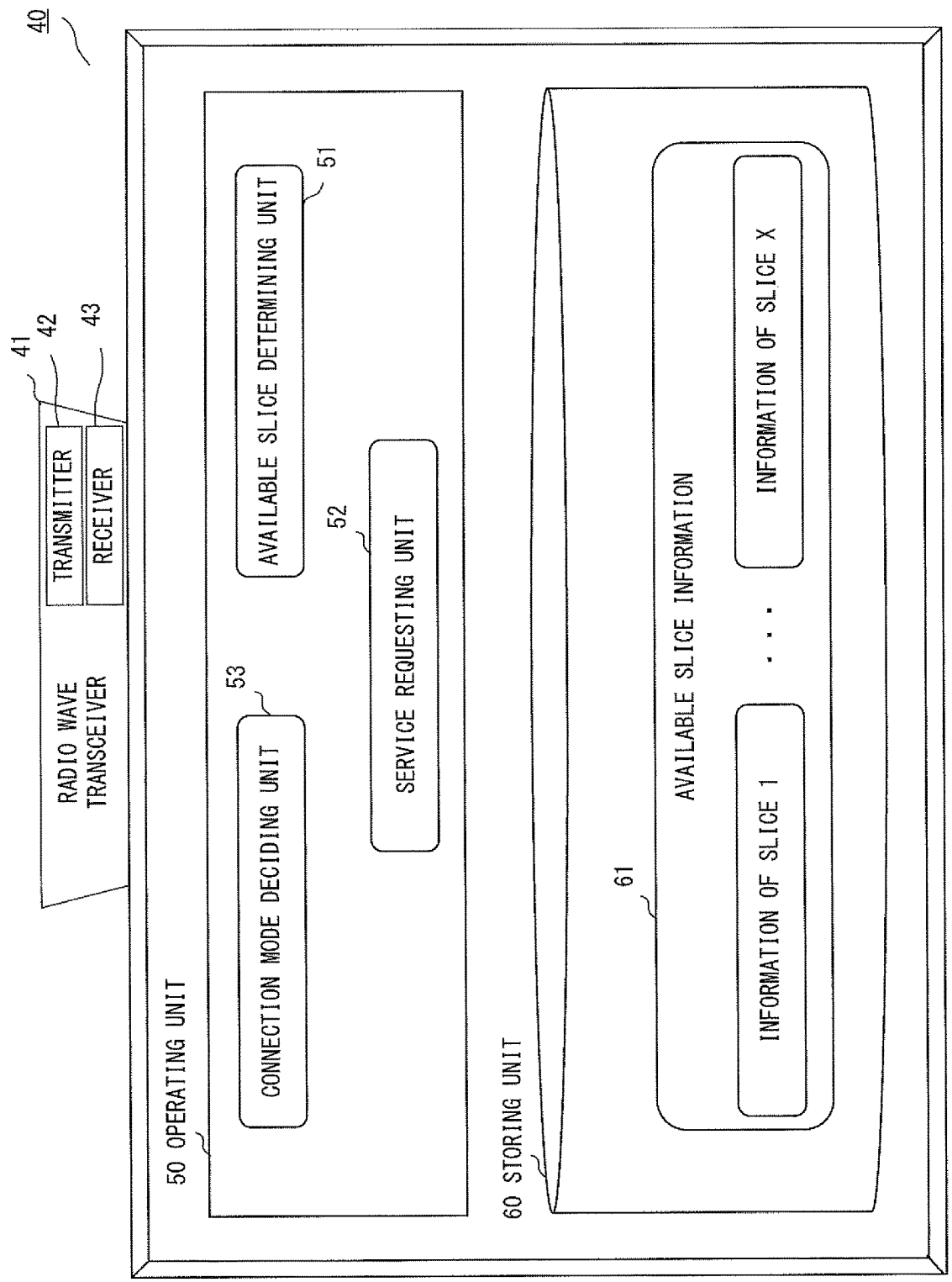
FIG. 4 is a diagram illustrating an example of a configuration of a terminal.

FIG. 4 is a diagram illustrating an example of the configuration of the terminal 40. The terminal 40 has a radio wave transceiver 41, an operating unit 50, and a storing unit 60. The operating unit 50 has an available slice determining unit 51, a service requesting unit 52, and a connection mode deciding unit 53. The storing unit 60 stores available slice information 61.

The radio wave transceiver 41 has a transmitter 42 and a receiver 43. The transmitter 42 performs transmission of signals, and the receiver 43 performs reception of signals. Upon receiving the reporting information via the receiver 43, the available slice determining unit 51 records, in the available slice information 61, for each slice, the information included in the reporting information. The service requesting unit 52 identifies the service to be used by the terminal 40 according to the content of the setting made in advance, operation by the user, and the like, and also outputs, to the connection mode deciding unit 53, a request for starting the service. The connection mode deciding unit 53 selects a slice that is suitable for providing the requested service, by referring to the information in the available slice information 61 with the service requested by the service requesting unit 52 being the key. Further, the connection mode deciding unit 53 also identifies the connection mode for performing connection via the slice, using the available slice information 61. The connection mode deciding unit 53 generates a connection request using the identified connection mode and sends it to the base station 10 via the transmitter 42.

Figure 5:
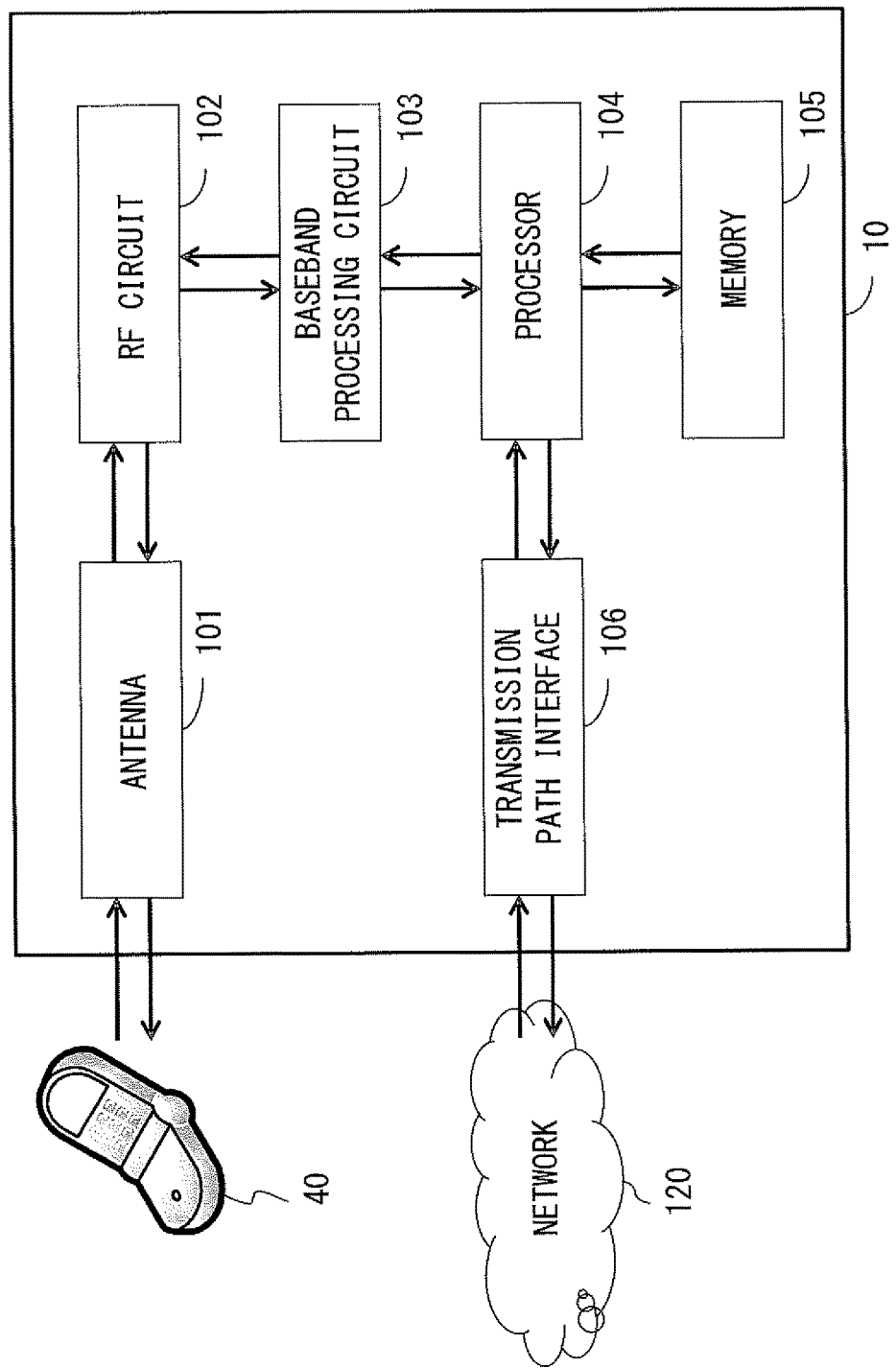
FIG. 5 is a diagram illustrating an example of a hardware configuration of a base station.

FIG. 5 is a diagram illustrating an example of the hardware configuration of the base station 10. The base station 10 has an antenna 101, an RF (Radio Frequency) circuit 102, a baseband processing circuit 103, a processor 104, a memory 105, and a transmission path interface 106. The RF circuit 102 processes signals including carrier waves and transmits/receives signals to/from the terminal 40 via the antenna 101. The baseband processing circuit 103 processes baseband signals. The processor 104 is an arbitrary processing circuit and may be, for example, a CPU (Central Processing Unit). The processor 104 performs various processes by using the memory 105 as a working memory and executing programs. In the memory 105, RAM (RandomAccessMemory) is included, and further, non-volatile memories such as ROM (Read Only Memory) and the like are included. The memory 105 is used for storing data used for programs and for the processing by the processor 104. The transmission path interface 106 performs the communication process with devices in a network 120. Devices in the network 120 are, for example, the devices in the core network as well as other base stations 10. Meanwhile, programs may be provided while being stored in a non-transitory, computer-readable storage medium and may be installed on the base station 10.

The antenna 101, the RF circuit 102, and the baseband processing circuit 103 operate as the radio wave transceiver 11. The processor 104 operates as the operating unit 20. The memory 105 operates as the storing unit 30. The transmission path interface 106 operates as the communicating unit 12.

Figure 6:
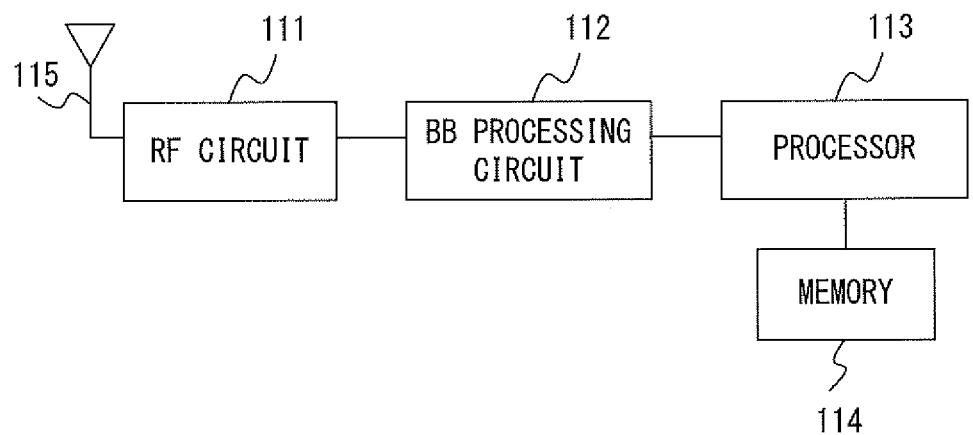
FIG. 6 is a diagram illustrating an example of a hardware configuration of a terminal.

FIG. 6 is a diagram illustrating an example of the hardware configuration of the terminal 40. The terminal 40 has an antenna 115, an RF circuit 111, a baseband (BB) processing circuit 112, a processor 113, and a memory 114. The RF circuit 111 processes signals including carrier waves. The baseband processing circuit 112 processes baseband signals. The processor 113 is an arbitrary circuit and may be, for example, a CPU. The processor 113 performs various processes by using the memory 114 as a working memory and executing programs. In the memory 114, RAM and ROM are included. Meanwhile, programs may be provided while being stored in a non-transitory, computer-readable storage medium and may be installed on the terminal 40.

The antenna 115, the RF circuit 111, and the baseband processing circuit 112 realize the radio wave transceiver 41. The processor 113 operates as the operating unit 50. The memory 114 operates as the storing unit 60.

First Embodiment

Figure 7:
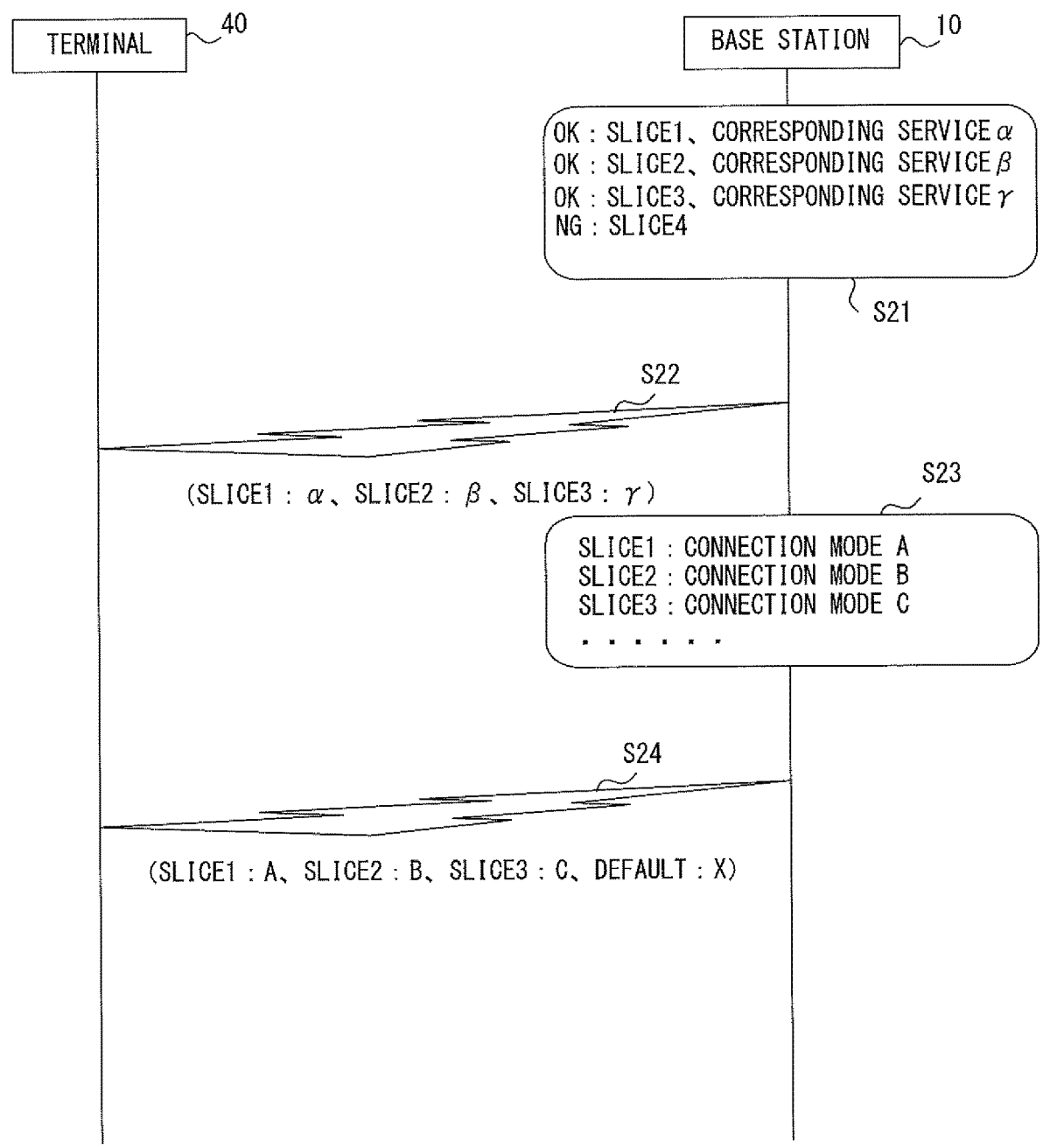
FIG. 7 is a sequence diagram illustrating an example of the reporting of information from a base station.

FIG. 7 is a sequence diagram illustrating an example of the reporting of information from the base station 10. In the example below, it is assumed that the base station 10 has divided resources available for communication such as the frequency band into a slice 1 through a slice 4 as well. Here, it is assumed that each slice has a communication quality that is suitable for the service with which the slice is associated. For example, the slice 1 may be suitable for communication with which the amount of transmitted/received data is small and the access frequency is also low, such as communication in a sensor network according to the IoT. Meanwhile, it is assumed that the slice 2 is suitable for communication with a relatively high throughput, whereas the slice 3 is suitable for communication with a medium level of throughput. Thus, the communication quality is different depending on the slice, and therefore, it is desirable that the terminal 40 is connected to the base station 10 using a slice that is suitable for the characteristics of communication that occurs in the service provide to the terminal 40.

In Step S21, the resource information obtaining unit 21 updates the slice resource information 32 for each slice, by checking the resources of the base station 10 for each slice. The resource information obtaining unit 21 identifies the availability status of the resources of each slice, and also identifies the service associated with the slice to which a new terminal 40 can be connected. In the example in FIG. 7, it is assumed that the slice 4 does not have resources left for establishing a new connection, but for the slice 1 through the slice 3, connection of anew terminal 40 is possible. Further, it is assumed that the slice 1 is associated with the service α, the slice 2 with the service β, and the slice 3 with the service γ. The resource information obtaining unit 21 reports the obtained information to the reporting unit 22.

The reporting unit 22 generates reporting information using the information reported from the resource information obtaining unit 21 and transmits, via the transmitter 13, the generated reporting information (Step S22). In the example in FIG. 7, the reporting unit reports, in the reporting information, that the slice 1 is associated with the service α, the slice 2 is associated with the service β, and the slice 3 is associated with the service γ. Meanwhile, in the reporting information, not only the information of the slices that are available for the allocation of resources but also the availability information of resources for all the slices may also be included. In the case in which information of all the slices is reported, information such as the following one is reported.

Slice 1: Connection OK, Service α
Slice 2: Connection OK, Service β
Slice 3: Connection OK, Service γ
Slice 4: Connection NG The terminal 40 receives the reporting information at the receiver 43. The available slice determining unit 51 stores, as the available slice information 61, for each slice, the information reported by the reporting information.

In Step S23, the resource information obtaining unit 21 identifies the connection mode associated with each of the slices to which a terminal 40 may be newly connected, by referring to the connection mode correspondence list 33. In the example in FIG. 7, the resource information obtaining unit 21 identifies that the connection mode A is associated with the slice 1, the connection mode B to the slice 2, and the connection mode C to the slice 3. The resource information obtaining unit 21 reports the obtained information to the reporting unit 22.

The reporting unit 22 transmits, via the transmitter 13, the information reported from the resource information obtaining unit 21 (Step S24). In the example in FIG. 7, information indicating that the terminal 40 connecting to the slice 1 uses the connection mode A, and the terminal 40 connecting the slice 2 uses the connection mode B, and the terminal 40 connecting to the slice 3 uses the connection mode C is included in the reporting information. Further, in the reporting information, information indicating that the terminal 40 (default) for which the slice is not specified uses the connection mode X is also included.

Upon receiving the reporting information via the receiver 43, the available slice determining unit 51 of the terminal 40 adds, to the available slice information 61, for each slice, the information in the reporting information.

Figure 8:
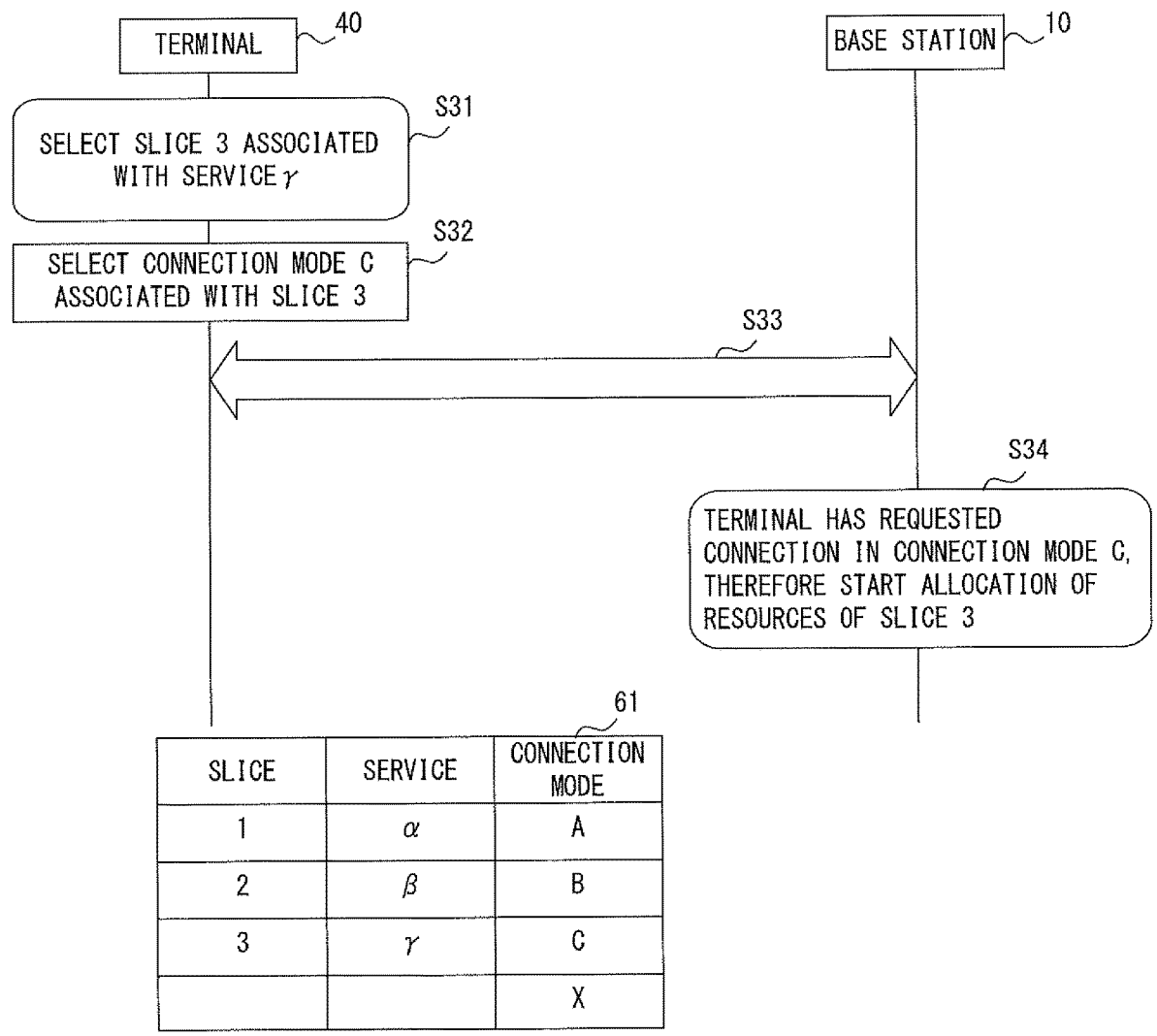
FIG. 8 is a sequence diagram illustrating an example of processes performed at the time of a connection request.

FIG. 8 is a sequence diagram illustrating an example of processes performed at the time of a connection request. The available slice information 61 held by the terminal 40 that received the reporting information explained in FIG. 7 is as illustrated in FIG. 8.

It is assumed that a request for the service γ was input from the service requesting unit 52 to the connection mode deciding unit 53. Further, it is assumed that the connection mode deciding unit 53 identified that the slice 3 was associated with the service γ, by referring to the available slice information 61. Then, the connection mode deciding unit 53 selects the slice 3 associated with the service γ as the connection-destination slice (Step S31). Further, the connection mode deciding unit 53 selects the connection mode C that is associated with the slice 3, by referring to the available slice information 61 (Step S32). The connection mode deciding unit 53 makes a request, via the transmitter 42, to the base station 10 for a connection process in the connection mode C (Step S33).

The receiver 14 of the base station 10 receives the connection request transmitted from the terminal 40. The connection mode deciding unit 23 identifies the connection mode requested by the terminal 40, using the information included in the connection request, and the allocation processing unit 24 performs the connection process using the slice associated with the identified connection mode. In the example in FIG. 8, the terminal 40 has requested connection in the connection mode C, and therefore, the allocation processing unit 24 starts allocation of resources of the slice 3 (Step S34). Meanwhile, after the process of Step S34, a change of the reporting information, or the like, may also be performed, as is appropriate.

Figure 9:
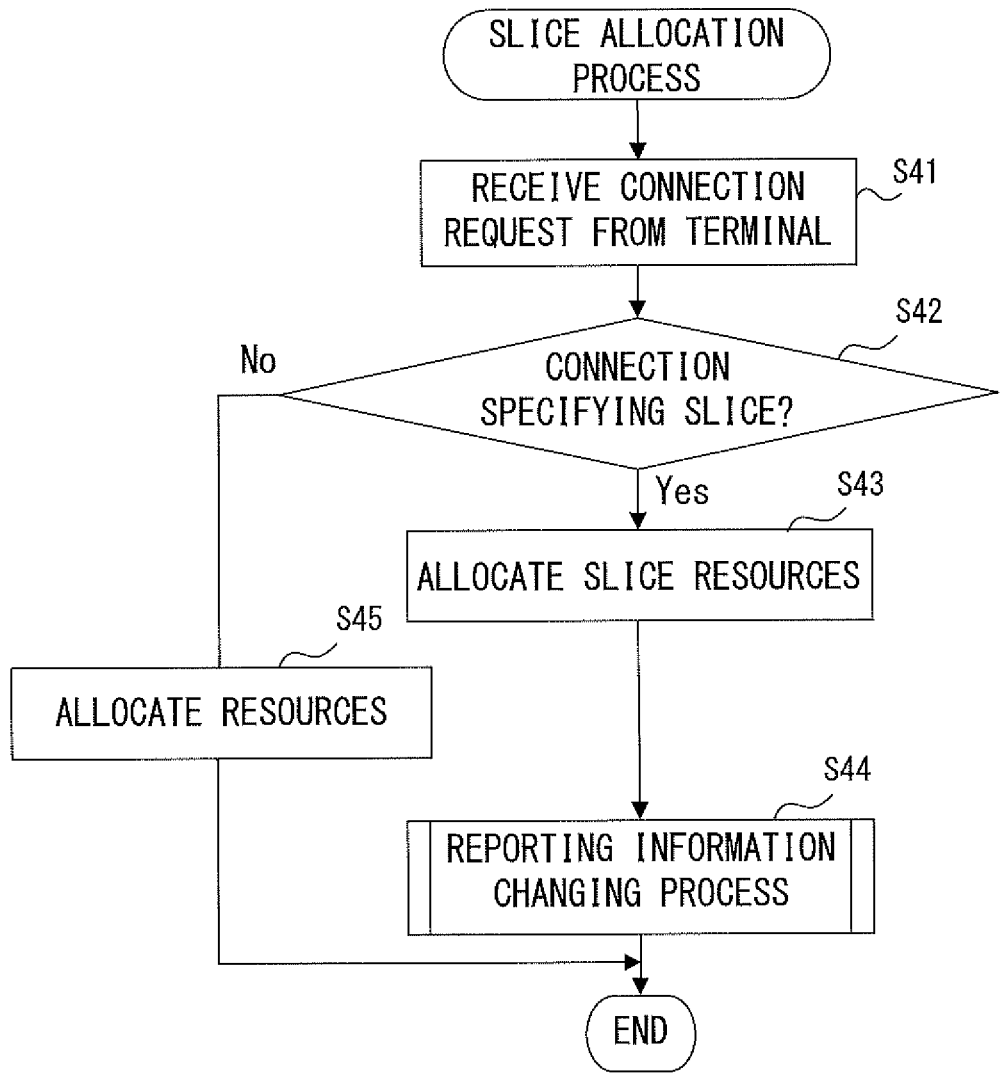
FIG. 9 is a flowchart illustrating an example of processing at a base station.

FIG. 9 is a flowchart illustrating an example of processing at the base station 10. The receiver 14 receives a connection request from the terminal 40 (Step S41). The connection mode deciding unit determines whether a connection specifying the connection-destination slice is being requested, using the type of the mode of the connection requested by the connection request (Step S42). In the case in which a connection specifying the connection-destination slice is being requested, the allocation processing unit 24 allocates resources of the slice to which the terminal 40 is going to connect (Yes in Step S42, Step S43). After that, the reporting unit 22 performs a changing process for the reporting information, as is appropriate (Step S44). Meanwhile, when a connection specifying the connection-destination slice is not being requested, the allocation processing unit 24 performs a process for allocating, to the terminal 40, resources of a slice having relatively more resources to spare (No in Step S42, Step S45).

Figure 10:
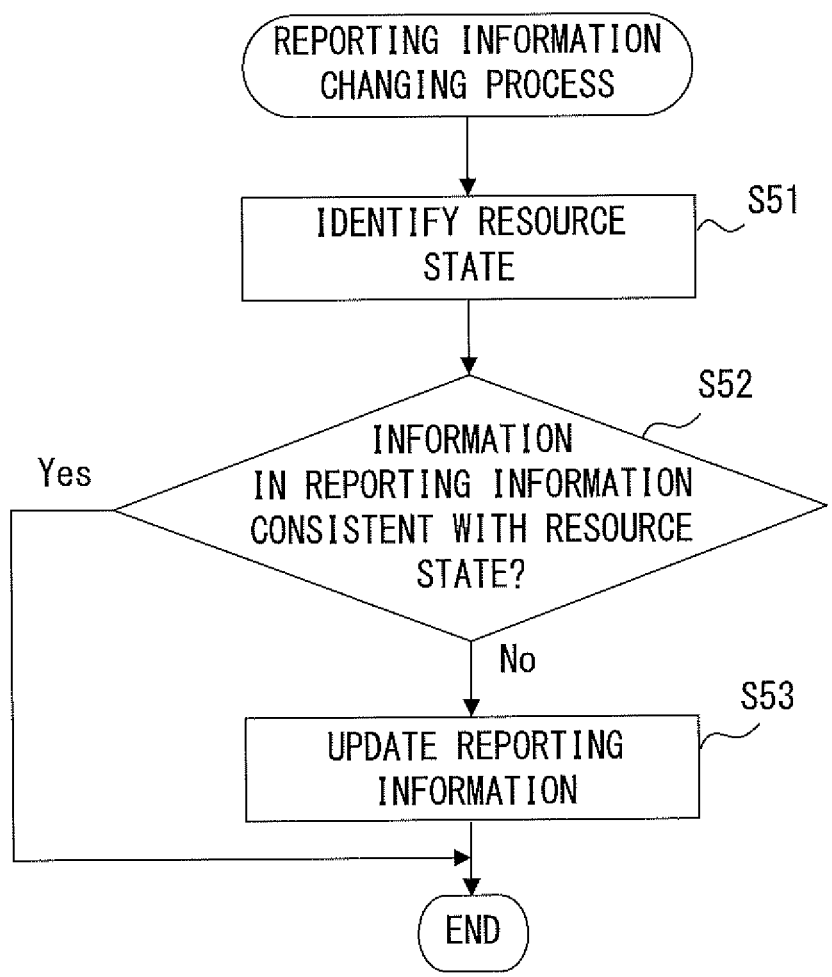
FIG. 10 is a flowchart illustrating an example of a process for changing reporting information.

FIG. 10 is a flowchart illustrating an example of a process for changing the reporting information. FIG. 10 is a flowchart that presents the details of Step S44 in FIG. 9. The resource information obtaining unit 21 identifies, for each slice, the states of the usage condition of resources and the like (Step S51). The resource information obtaining unit 21 determines whether the states of the resources are consistent with the information in the reporting information (Step S52). In the case in which the information in the reporting information and the states of the resources are consistent, the resource information obtaining unit 21 terminates the process (Yes in Step S52). On the other hand, in the case in which the information in the reporting information and the states of the resources are not consistent, the resource information obtaining unit 21 makes a request to the reporting unit 22 for a change of the reporting information (No in Step S52). The reporting unit 22 updates the content of the reporting information according to the request from the resource information obtaining unit 21 (Step S53).

Figure 11:
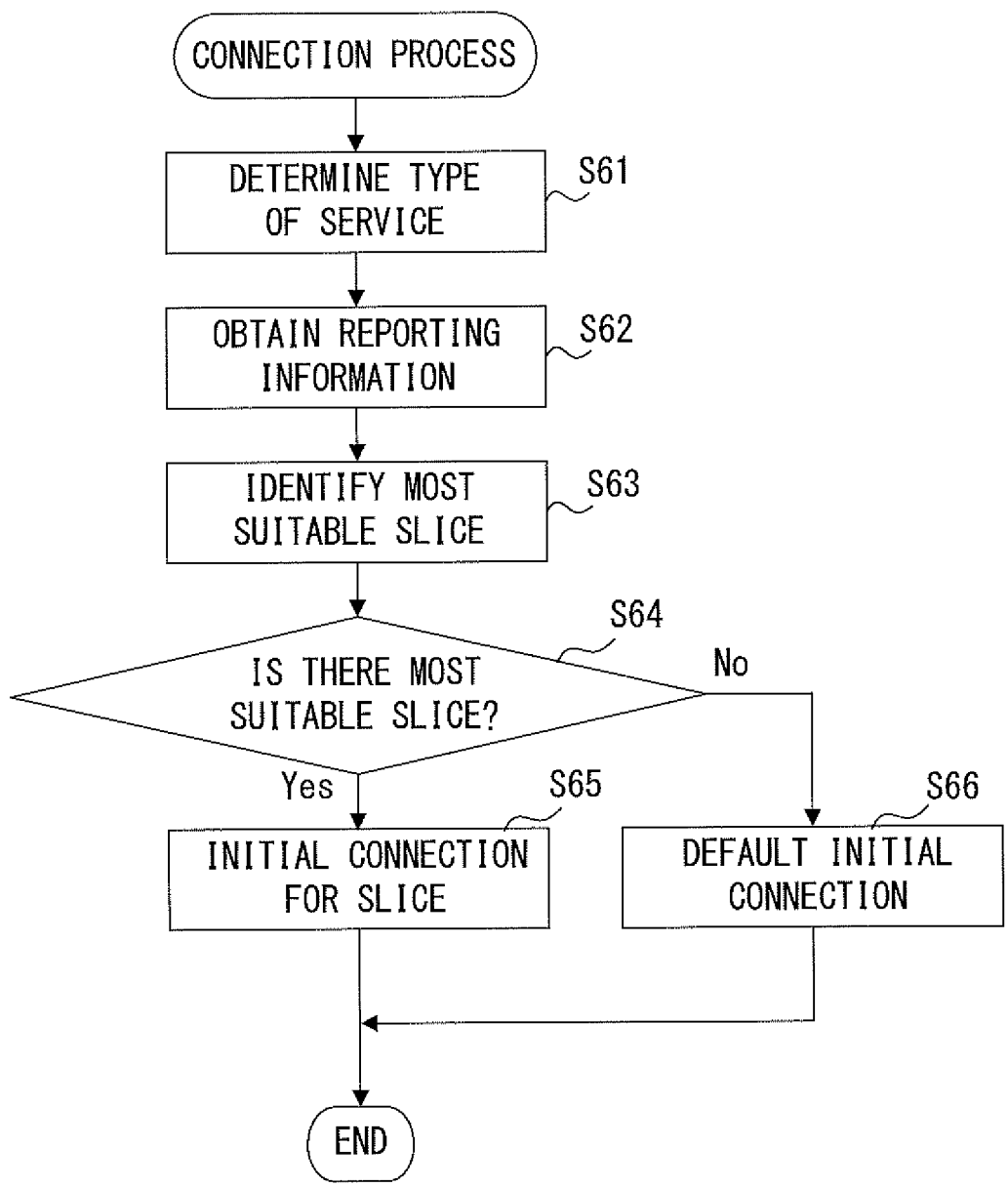
FIG. 11 is a flowchart illustrating an example of processing at a terminal.

FIG. 11 is a flowchart illustrating an example of processing at the terminal 40. Meanwhile, FIG. 11 is an example of the processing, and the procedure of the processing may be changed according the implementation. For example, the order of Step S61 and Step S62 may be changed arbitrarily.

The service requesting unit 52 determines the type of the service that the terminal 40 is requesting (Step S61). The available slice determining unit 51 obtains, via the radio wave transceiver 41, the reporting information sent from the base station 10 and records the obtained information in the available slice information 61 (Step S62). The connection mode deciding unit 53 refers to the available slice information 61 and identifies the slice associated with the service identified by service requesting unit 52 as the most suitable slice (Step S63). In the case in which the most suitable slice has been identified, the connection mode deciding unit 53 performs a process of initial connection for connecting to the identified slice (Yes in Step S64, Step S65). On the other hand, in the case in which the most suitable slice is not identified, the connection mode deciding unit 53 performs a process of initial connection using the connection mode set for the default initial connection (No in Step S64, Step S66). Meanwhile, in Step S66, the connection mode for the default initial connection is an initial connection mode used when the connection process is performed without specifying the slice.

Figure 12:
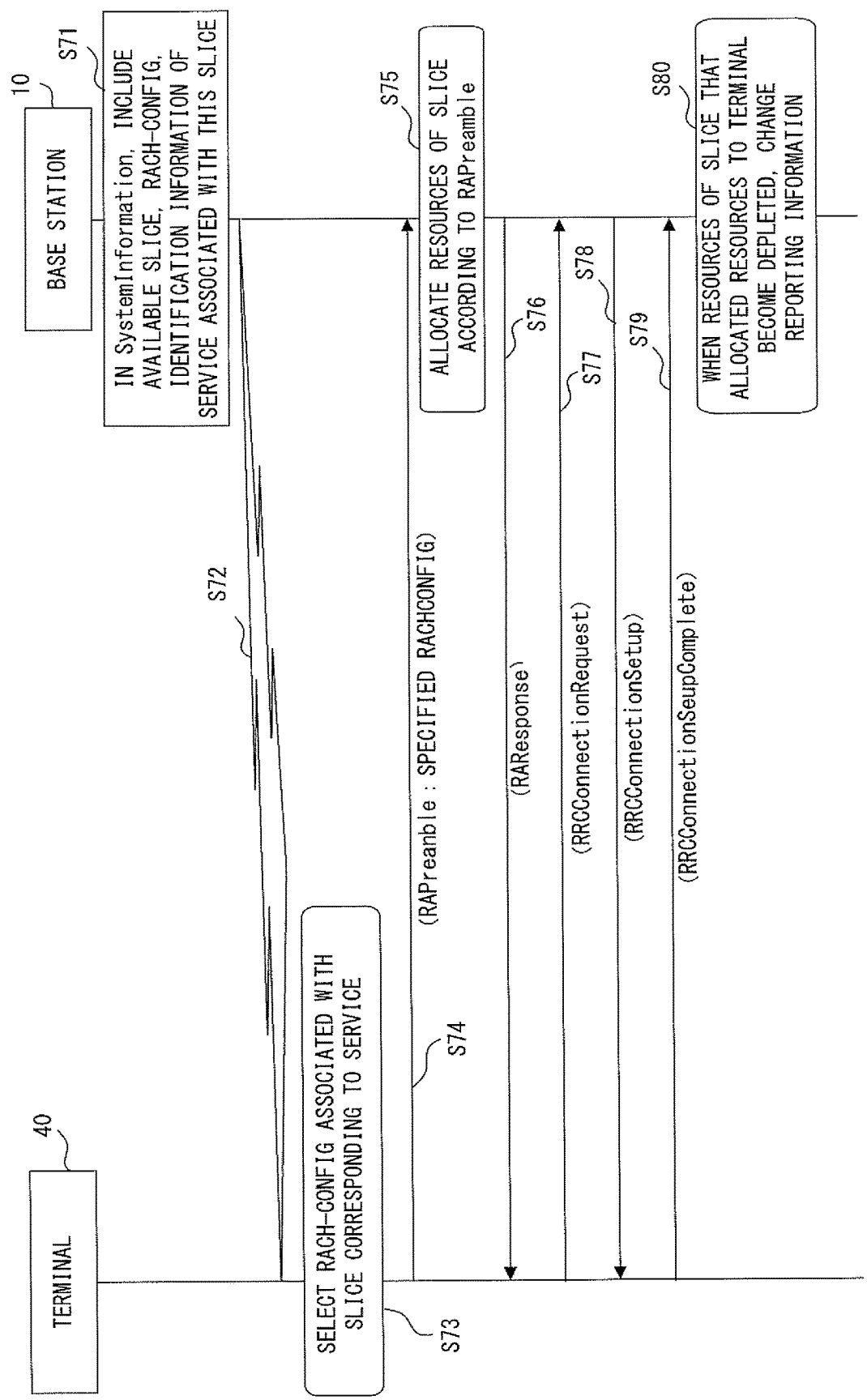
FIG. 12 is a sequence diagram illustrating an application example of a communication method according to the first embodiment.

FIG. 12 is a sequence diagram illustrating an application example of the communication method according to the first embodiment. FIG. 12 presents an example in a case in which the first embodiment is realized in the LTE (Long Term Evolution). Hereinafter, an example is presented in which the specifying of the connection-target slice is performed using the first message (Random Access Preamble, RAPreamble) sent from the terminal 40 to the base station 10. In the example in FIG. 12, the base station 10 is realized as an eNB (evolved Node B), and the terminal 40 is realized as a UE (User Equipment).

The reporting unit 22 of the base station 10 includes, in SystemInformation to be reported, an available slice, and RACH-CONFIG and identification information of the service that are associated with the slice (Step S71). The reporting unit 22 reports the reporting information via the transmitter 13 (Step S72).

The receiver 43 of the terminal 40 receives the reporting information. The available slice determining unit 51 records, in the available slice information 61, the information included in the reporting information. Accordingly, for each slice, the identification information of the service that is suitable for using the slice and the RACH-CONFIG used for the connection to each slice are stored. When the service to be requested is selected at the service requesting unit 52, the connection mode deciding unit 53 selects the RACH-CONFIG associated with the slice corresponding to the selected service (Step S73). The connection mode deciding unit 53 transmits RAPreamble using the selected RACH-CONFIG from the transmitter 42 (Step S74).

The connection mode deciding unit 23 of the base station 10 obtains the RAPreamble via the radio wave transceiver 11 and determines that a connection to the slice associated with the RACH-CONFIG in the RAPreamble has been requested. The connection mode deciding unit 23 reports the slice associated with the RACH-CONFIG in RAPreamble to the allocation processing unit 24. Then, the allocation processing unit 24 allocates resources of the slice associated with the RACH-CONFIG in the RAPreamble to the communication with the terminal 40 (Step S75).

After that, by the message exchange performed according to the procedure of the LTE, a connection using the resources allocated in Step S75 is established. That is, RAResponse is transmitted from the base station 10 to the terminal 40 (Step S76). Upon receiving the RAResponse, the terminal 40 transmits RRCConnectionRequest to the base station 10 (Step S77). In response to the RRCConnectionRequest, the base station 10 transmits RRCConnectioSetup to the terminal 40 (Step S78). Then, the terminal 40 transmits RRCConnectionSetupComplete to the base station 10 (Step S79).

When the connection process between the terminal 40 and the base station 10 is finished, the resource information obtaining unit 21 in the base station 10 updates the slice resource information 32 according to the usage condition of resources. In the case in which depletion of resources occurs in a slice from which resources have been allocated to the terminal 40, the reporting unit 22 updates the reporting information (Step S80).

As described above, the first embodiment may be applied to the LTE. The terminal 40 specifies a slice using the RAPreamble exchanged according to the communication procedure of the LTE, thereby making it possible to establish a connection via a slice suitable for the service that has been selected by the terminal 40.

Figure 13:
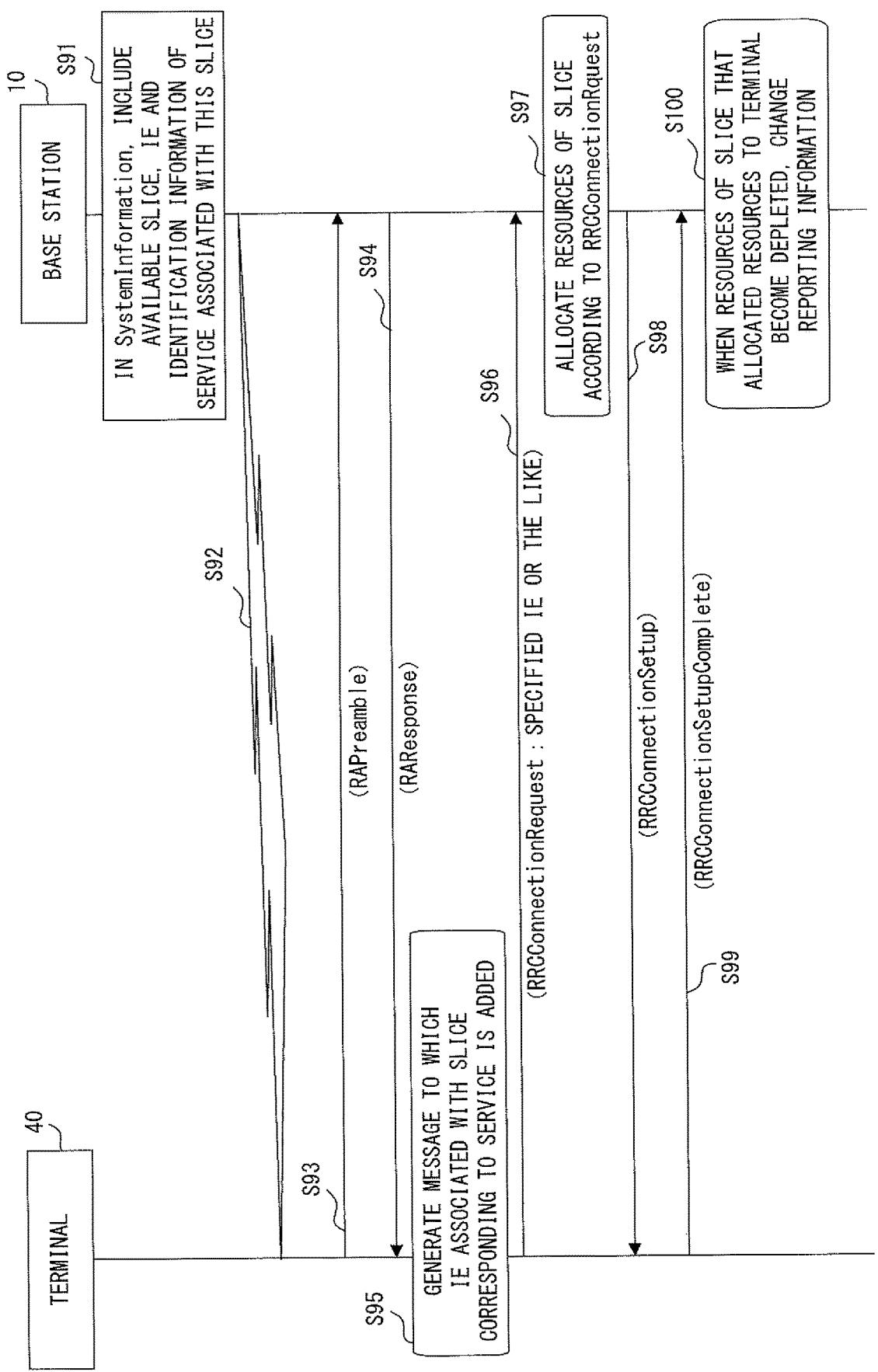
FIG. 13 is a sequence diagram illustrating an application example of a communication method according to the first embodiment.

FIG. 13 is a sequence diagram illustrating an application example of the communication method according to the first embodiment. Referring to FIG. 12, the case in which the slice is specified using the RAPreamble has been explained, but the message used for the specifying of the slice is not limited to the RAPreamble. In FIG. 13, an example is presented in which the specifying of the connection-target slice is performed using a third message (RRCConnectionRequest) exchanged between the terminal 40 and the base station 10. In FIG. 13, it is assumed that the base station 10 is realized as eNB, and the terminal 40 is realized as a UE as well.

The reporting unit 22 of the base station 10 includes, in SystemInformation to be reported, an available slice, and InformationElement (IE) and identification information of the service associated with the slice (Step S91). The reporting unit 22 reports the reporting information via the transmitter 13 (Step S92).

The receiver 43 of the terminal 40 receives the reporting information. The available slice determining unit 51 records, in the available slice information 61, the information included in the reporting information. Accordingly, for each slice, the identification using the slice and the InformationElement used for the connection to each slice are stored.

The connection mode deciding unit 53 transmits RAPreamble to the base station 10, via the radio wave transceiver 11 (Step S93). The base station 10 transmits RAResponse as a response to the RAPreamble (Step S94).

When the service to be requested is selected at the service requesting unit 52, the connection mode deciding unit 53 selects the InformationElement associated with the slice corresponding to the selected service. Further, the connection mode deciding unit 53 generates a message (RRCConnectionRequest) to which the selected InformationElement is added (Step S95). The connection mode deciding unit 53 transmits the RRCConnectionRequest including the selected InformationElement via the transmitter 42 (Step S96).

The connection mode deciding unit 23 of the base station 10 obtains the RRCConnectionRequest via the receiver 14. The connection mode deciding unit 23 determines that a connection to the slice associated with the InformationElement in the RRCConnectionRequest has been requested. The connection mode deciding unit 23 reports the slice associated with the InformationElement reported by the terminal 40 to the allocation processing unit 24. Then, the allocation processing unit 24 allocates resources of the slice associated with the InformationElement reported by the terminal 40 to the communication with the terminal 40 (Step S97). After that, by the message exchange performed according to the procedure of the LTE, a connection using the resources allocated in Step S97 is established. The processes in Steps S98 through S100 are similar to the processes in Step S78 via S80 explained with reference to FIG. 12.

As described above, the terminal 40 specifies a slice using the RRCConnectionRequest exchanged according to the communication procedure of the LTE, thereby making it possible to establish a connection via a slice suitable for the service that has been selected by the terminal 40.

Figure 14:
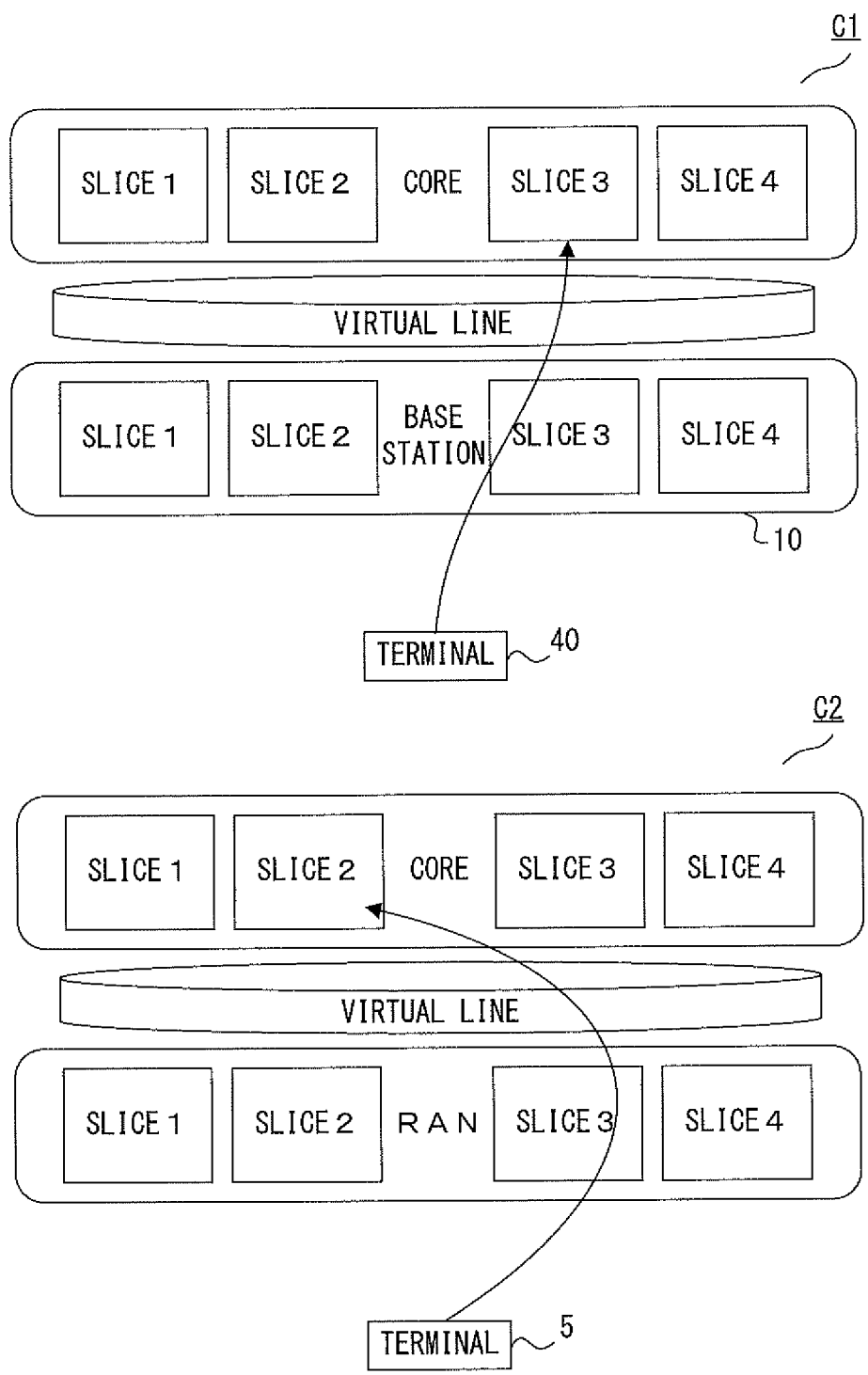
FIG. 14 is a diagram illustrating a comparison example between a communication method according to the first embodiment and another communication method.

FIG. 14 is a diagram illustrating a comparison example of the communication method according to the first embodiment and another communication method. A case C1 in FIG. 14 presents an example of the condition of resource allocation according to the first embodiment. Meanwhile, a case C2 presents an example of the condition of resource allocation according to another communication method.

In the communication method presented in the case C2, the type of the service that a terminal 5 is going to receive is not reported to the base station. For this reason, even when the base station has divided resources into a plurality of slices, it does not recognize to which slice the terminal 5 wishes to connect. Therefore, for example, connection with the terminal 5 is established according to the availability status of resources of each slice, or the like. In the example of the case C2, it is assumed that the service which the terminal 5 uses is provided by the slice 2 of the core network, but the base station applied resources of the slice 3 to the connection with the terminal 5. In this case, there is a risk that the communication quality of at the terminal 5 may deteriorate, because the communication quality is different between the slice 2 and the slice 3. For example, in a case in which a high throughput can be obtained with the slice 2 but only a medium-level throughput can be obtained with the slice 3, the terminal 5 is only able to obtain the communication quality of the slice 3 used for the communication between the terminal 5 and the base station. For this reason, communication that matches the service is not performed.

Meanwhile, in order to make the qualities of the slice set in the base station and the slice in the core network consistent, it may also be considered to notify the slice from the core-network side to the base station. In this case, the device(s) in the core network is to identify the type of the service that the terminal has requested to decide the slice, and to notify the base station of the slice to be used. However, even if such a process is performed, the device (s) in the core network does not understand the usage condition of resources in individual base stations. For this reason, in a case in which the device in the core network decides to use the slice 2 in the core network for the communication with the terminal 40, there is a possibility that depletion of resources of the slice 2 has occurred at the base station. In such a case, new communication using the slice 2 is not performed at the base station, and therefore, eventually, inconsistency occurs between the slice used for the communication between the base station and the terminal, and the slice used for the communication in the core network.

In the method according to the first embodiment, as illustrated in the case C1, the terminal 40 is able to notify the base station 10 of the slice associated with the service used by the terminal 40, by identifying the connection mode. The terminal 40 identifies the slice by identifying the connection method, and therefore, according to the first embodiment, an effect may be obtained that is similar to when the quality required for the communication that the terminal 40 is going to establish is notified from the terminal 40 to the base station 10. Accordingly, the allocation processing unit 24 in the base station 10 is able to establish communication between the terminal 40 and the base station 10 with the communication quality desired by the terminal 40, using the slice notified from the terminal 40. Furthermore, the slice notified from the terminal 40 is a slice that is consistent in communication quality with the slice used for the communication at the core-network side. In the example of the case C1, the terminal uses the service provided by the slice 3, and therefore, communication using the slice 3 can be established for both the communication with the base station 10 and the communication in the core network. Therefore, it is possible to avoid deterioration of the communication quality due to the difference in the types of the slices used for the communication between the terminal 40 and the base station 10 and the slice used for the communication in the core network.

Second Embodiment

In the second embodiment, an example of a case in which the base station 10 reports, in the reporting information, the characteristics and the connection mode of the communication obtained with the slice available for connection.

Figure 15:
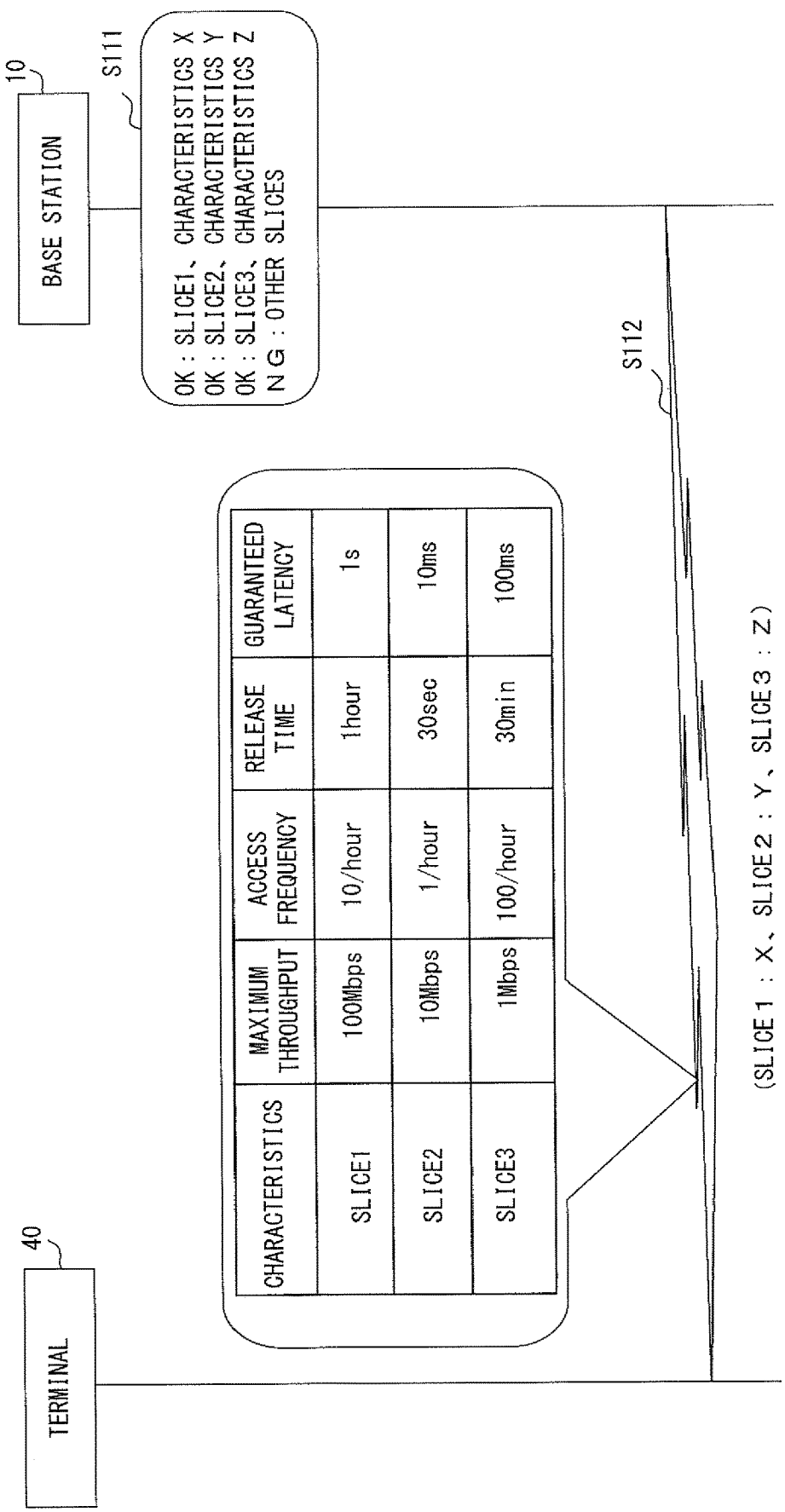
FIG. 15 is a sequence diagram illustrating an application example of a communication method according to the second embodiment.

FIG. 15 is a sequence diagram illustrating the communication method according to the second embodiment. Upon receiving information of slices that are available for connection from the resource information obtaining unit 21, the reporting unit 22 in the base station 10 includes, in the reporting information, for each of the slices available for connection, the characteristics of the connection via the slice (Step S111). For example, in the example in FIG. 15, it is assumed that the slice 1 through the slice 3 can establish communication with a new terminal 40, but other slices do not have resources left for establishing connection with a new terminal 40. Then, the reporting unit 22 includes the characteristics X of the slice 1, the characteristics Y of the slice 2, and the characteristics Z of the slice 3 in the reporting information, in association with each slice. In the example in FIG. 15, in the characteristics of each slice, the maximum throughput, the access frequency, the release time, and the guaranteed latency are included. Here, the maximum throughput is the maximum value of the transfer rate of data obtained with the communication in the case in which the slice is used. The access frequency is the frequency of accesses from the terminal 40 expected in the communication made via the slice. The release time is the waiting time in the communication made via the slice, in the case when there is no communication for a given terminal 40, before deleting the allocation of resources for this terminal 40. The guaranteed latency is the maximum value of delay in data transfer on the network via the slice.

In the example in FIG. 15, the maximum throughput of the communication when using the slice 1 is 100 Mbps, the access frequency is about 10 times in an hour, the release time is one hour, and the guaranteed latency is one second. With the communication obtained when using the slice 2, the maximum throughput is 10 Mbps, the access frequency is about once in an hour, the release time is 30 seconds, and the guaranteed latency is 10 milliseconds. In addition, with the commutation obtained when using the slice 3, the maximum throughput is 1 Mbps, the access frequency is about 100 times in an hour, the release time is 30 minutes, and the guaranteed latency is 100 milliseconds. The reporting unit 22 transmits the generated reporting information from the transmitter 13 (Step S112). Meanwhile, while it is not illustrated in FIG. 15, in the reporting information, the communication mode used for the connection to each slice is also included, in a similar manner as in the first embodiment.

The terminal 40 is able to identify, for each of the accessible slices, the character of the communication obtained when using the slice. For example, in the case of FIG. 15, the available slice determining unit 51 and the connection mode deciding unit 53 in the terminal 40 are able to recognize that, when using the slice 1, the maximum throughput is relatively large, but the guaranteed latency is long, and the assess frequency is set to the medium level. In a similar manner, information such as that, with the slice 2, the maximum throughput is the medium level while the release time is short, and with the slice 3, the maximum throughput is small while the access frequency is set high, can be recognized by the available slice determining unit 51 and the connection mode deciding unit 53. In addition, the connection mode used for the connection to each slice is also recorded in the available slice information 61, by a process similar to that in the first embodiment.

Accordingly, the connection mode deciding unit 53 is able to select the slice that is most suitable for the characteristics of the service reported from the service requesting unit 52. Furthermore, even in the case in which the most suitable slice for the characteristics of the service is not found, the connection mode deciding unit 53 is able to select, as the connection destination, the slice with which a communication that is closest to the characteristics of the communication required for the service used by the terminal 40 may be obtained, according to the characteristics of the communication with each slice. The connection mode deciding unit 53 performs a communication process via the radio wave transceiver 41 using the communication mode used for the connection to the selected slice. The processes after the base station 10 receives the connection request from the terminal 40 are similar to those in the first embodiment.

Figure 16:
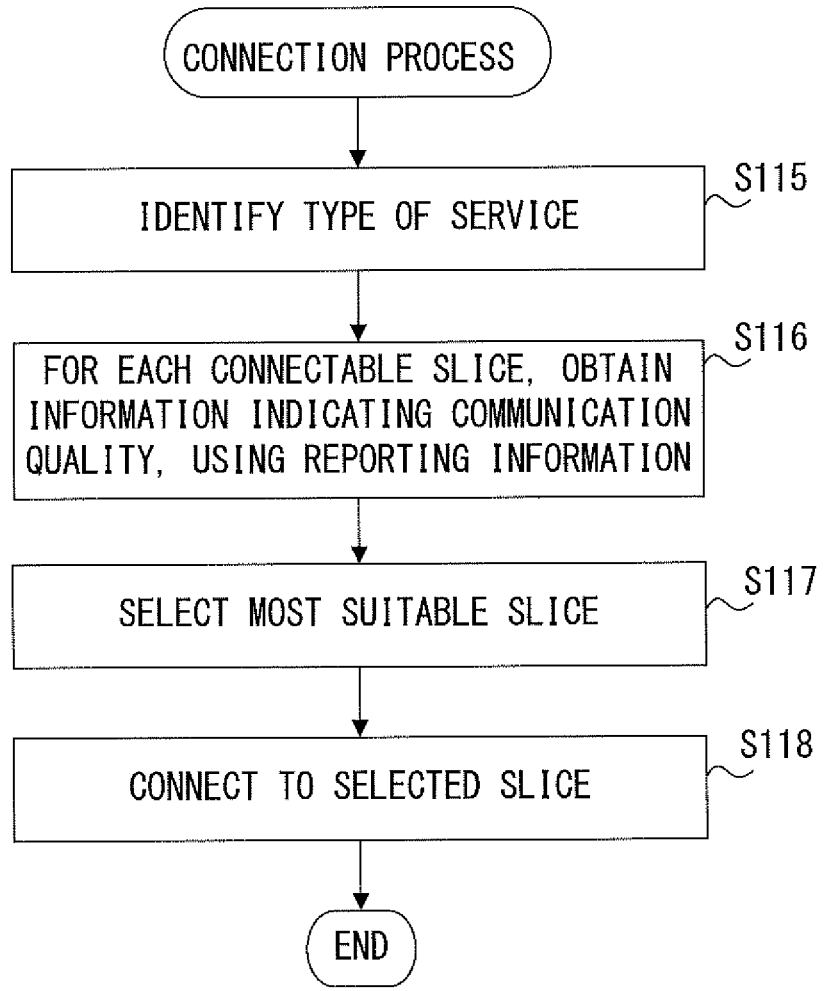
FIG. 16 is a flowchart illustrating an example of processing at a terminal.

FIG. 16 is a flowchart illustrating an example of processing at the terminal. Meanwhile, FIG. 16 is an example of the processing, and the procedure of the processing may be changed according the implementation. For example, the order of Step S115 and Step S116 may be changed arbitrarily.

The service requesting unit 52 determines the type of the service that the terminal 40 is requesting (Step S115). The available slice determining unit 51 obtains, for each of the slices available for connection, information indicating the communication quality, using the reporting information transmitted from the base station 10 (Step S116). At this time, the available slice determining unit 51 records the obtained information in the available slice information 61. The connection mode deciding unit 53 refers to the available slice information 61 and selects, as the most suitable slice, a slice with which the communication quality that is closest to the character of the communication used for the service identified by the service requesting unit 52 (Step S117). The connection mode deciding unit 53 performs a connection process to the selected slice (Step S118).

Figure 17:
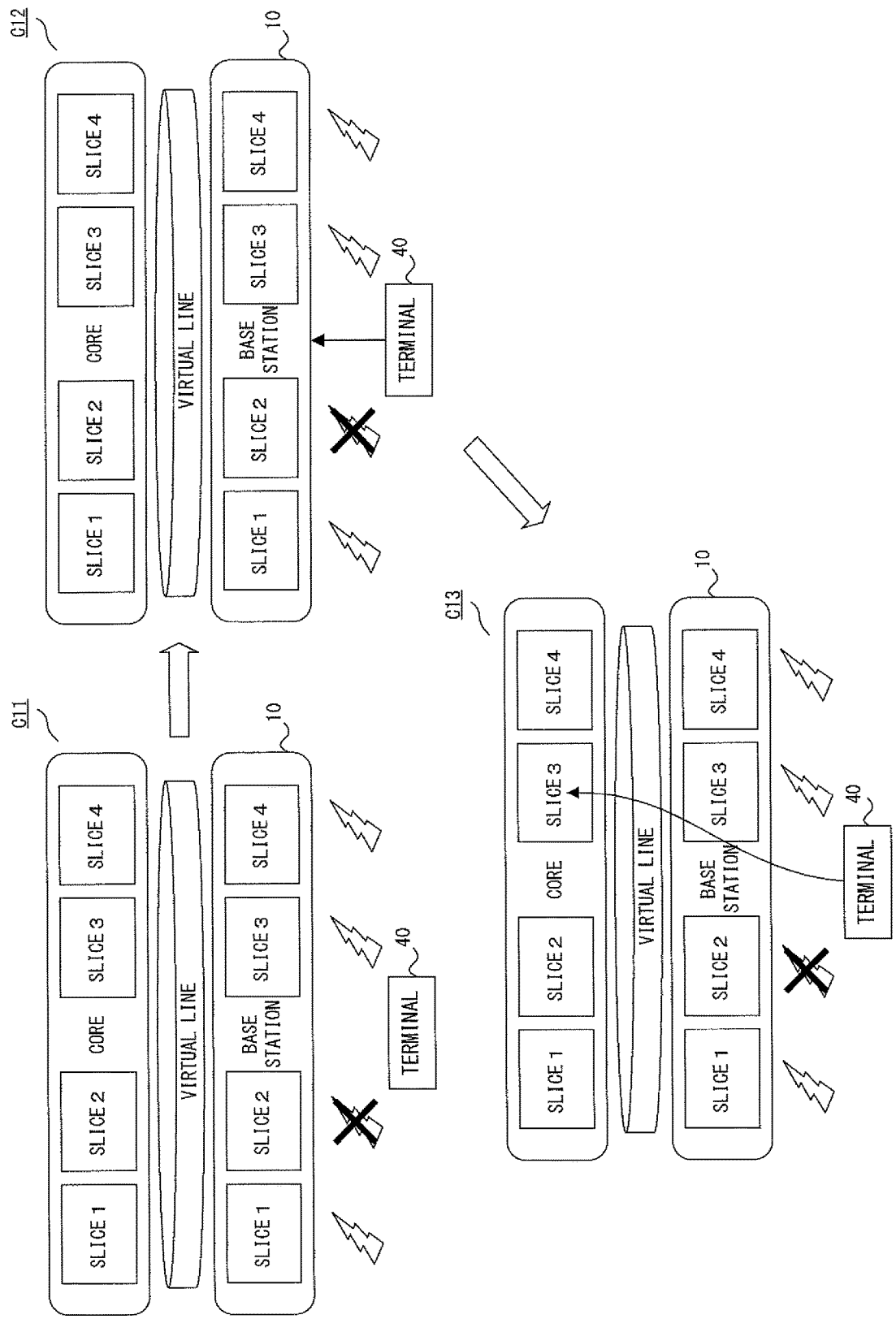
FIG. 17 is a diagram illustrating an application example of a communication method according to the second embodiment.

FIG. 17 is a diagram illustrating an application example of the communication method according to the second embodiment. For example, as presented in a case C11, it is assumed that the core network is divided into a slice 1 through a slice 4, and the resources of the base station 10 are also divided into a slice 1 through a slice 4. A slice set in the base station 10 provides connection with the connection quality suitable for a communication with the slice assigned with the same number in the slices set in the core network. For example, the slice 1 of the base station provides a communication quality that is suitable for communication of the slice 1 of the core network. In the example in FIG. 17, it is assumed that resources of the slice 2 of the base station 10 have been depleted, and there are not enough resources for connecting a new terminal 40 to the slice 2. Then, the base station 10 transmits reporting information including the communication quality obtained when using each of the slice 1, the slice 3, and the slice 4. However, the base station 10 does not include, in the reporting information, the communication quality obtained when using the slice 2. In addition, the base station 10 also reports the communication mode used for the connection to each of the slice 1, the slice 3, and the slice 4, in the reporting information.

The available slice determining unit 51 that has obtained the reporting information transmitted in the case C11 records the obtained information as the available slice information 61. Here, it is assumed that the service suitable for the slice 2 was selected by the service requesting unit 52. The connection mode deciding unit 53 selects, as the connection destination, the slice that provides a communication that is closest to the character of the communication required for the selected service. For example, in the case C12, it is assumed that the connection mode deciding unit 53 selects the slice 3 as the connection destination. The connection mode deciding unit 53 transmits a connection request using the connection mode used for the connection of the slice 3.

In the case C13, the base station 10 performs the connection process with the terminal 40 using the slice 3. In addition, the slice in the core network used for the communication of the terminal 40 is decided in association with the slice that was used for the connection in the base station 10. Accordingly, as presented in the case C13, the slice 3 is used in both the core network and the base station 10, and therefore, the communication quality becomes the quality provided by the slice 3.

Meanwhile, the combination is made so that the communication quality of the slice used at the RAN side such as the base station 10 and the communication quality obtained by the slice used in the core network become optimal, there is also an effect that the communication of the system as a whole becomes efficient. For example, in a case in which the slice 3 is used in the base station 10 and the slice 2 is used in the core network, even when the slice 2 has a better quality than that of the slice 3, the quality of communication that the terminal 40 can receive is to be the quality of the slice 3. Meanwhile, in the explanation so far, explanation has been made while focusing on one base station 10 in order to facilitate understanding, but a communication system may include a plurality of base stations 10. Accordingly, even when resources of the slice 2 have been depleted in a base station 10a, connection to the slice 2 may still be possible in another base station 10b. In this case, rather than to allocate the slice 2 in the core network for the communication from the base station 10a via the slice 3, it is more efficient to allocate, to the communication of another terminal 40 that is connecting from the base station 10b via the slice 2, the slice 2 at the core-network side as well. Therefore, with the slice set in the base station 10 and the slice in the core network both being selected according to the connection mode in which the terminal 40 connects to the base station 10, the allocation of resources in the communication system as a whole become efficient.

Third Embodiment

In the third embodiment, processing is explained in a case in which, in a system in which a plurality of base stations 10 are included, a base station 10 in which depletion of resources has not occurred is prioritized, as a connection destination, over a base station 10 in which resources of a slice have been depleted.

Figure 18:
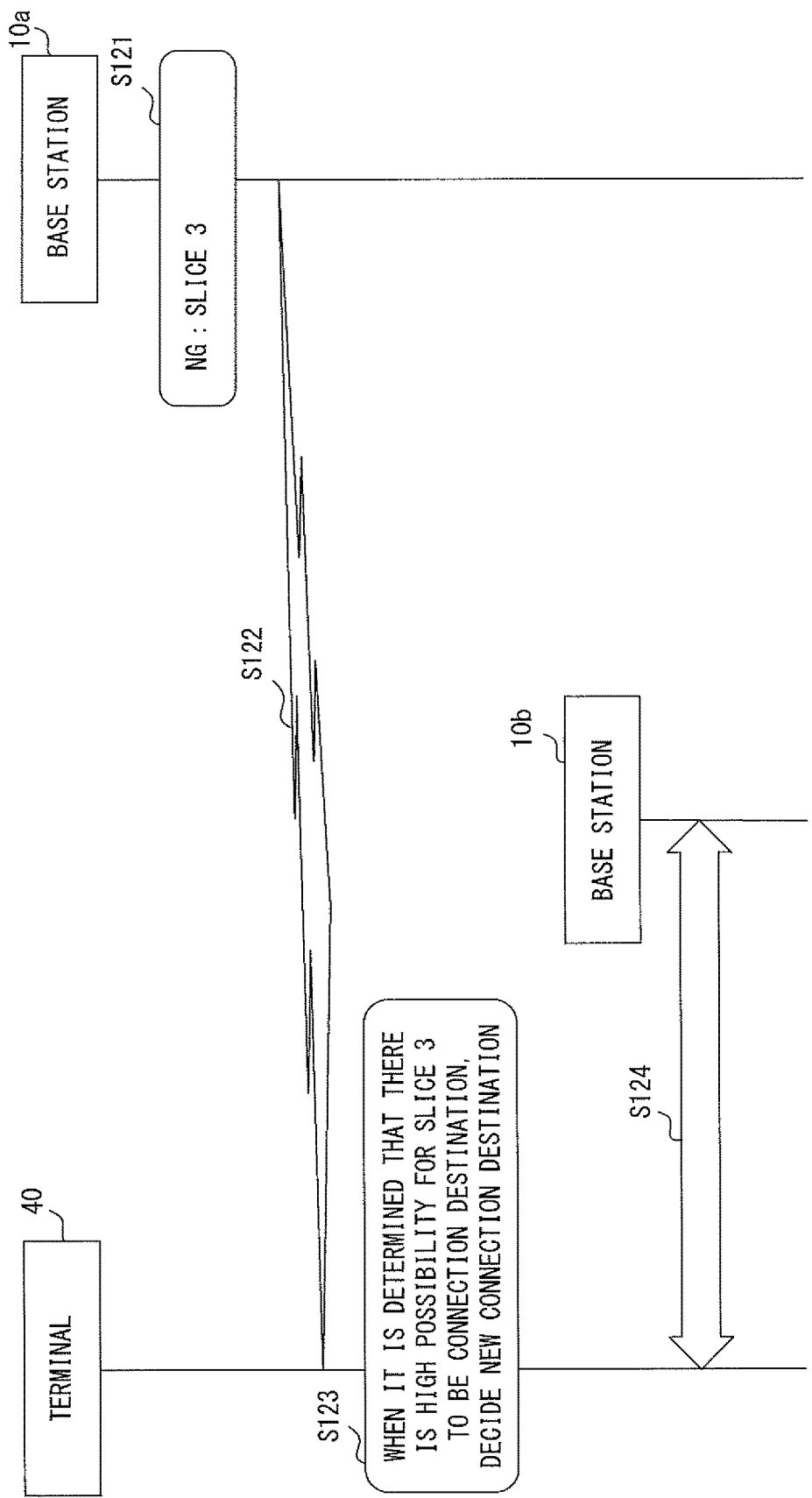
FIG. 18 is a sequence diagram illustrating a communication method according to the third embodiment.

FIG. 18 is a sequence diagram illustrating the communication method according to the third embodiment. In the example in FIG. 18, a base station 10a and a base station 10b are included in the system, and it is assumed that resources of the slice 3 have been depleted in the base station 10*a* (Step S121). The reporting unit 22 that has been notified from the resource information obtaining unit 21 that resources of the slice 3 has been depleted includes, in the reporting information, information that would make it less likely for a terminal 40 that is going to select the slice 3 as the connection destination to connect to the base station 10*a*. In other words, it can be said that the base station 10*a* is transmitting information to reduce the priority of the base station 10*a* as a connection destination of the terminal 40. For example, the reporting unit 22 is able to report an offset to the terminal 40 that is going to make the slice 3 the connection destination so that the reception power measurement value is set at a value that is worse than the actual measurement value by a predetermined value. The reporting unit 22 transmits the generated reporting information via the radio wave transceiver 11 (Step S122). Meanwhile, in the reporting information, the information explained in the first or the second embodiment is also included, and therefore, it is assumed that the terminal 40 that has received the reporting information is able to select the connection mode for each service.

The available slice determining unit 51 of the terminal 40 records, in the available slice information 61, the information included in the reporting information. It is assumed that the connection mode deciding unit 53 decided to make the slice 3 the connection destination, according to a request from the service requesting unit 52. Here, the method for deciding the slice according to the service is assumed to be similar to the process described in the first or the second embodiment. The connection mode deciding unit 53 decides the connection destination for performing connection using the slice 3 (Step S123). For example, it is assumed that the received power at the terminal 40 from the base station 10*a* is −20 dbm, and the received power at the terminal 40 from the base station 10*b* is −30 dbm. Further, it is assumed that, as an offset value for the time when connecting the slice 3, −30 dbm has been specified from the base station 10*a*, and 0 dbm has been specified from the base station 10*b*. Then, the connection mode deciding unit 53 calculates, according to the formula (1), for each base station, the receiving power at the time when communication via the slice is performed.

$$R=Rm+Roff \quad (1)$$

Here, R is the calculated value of the receiving power to be used for the selection of the connection destination, and Rm is the actual measurement value of the received power from each base station. Roff is the offset reported from each base station. Therefore, for the time when performing connection using the slice 3, the terminal 40 calculates the received power from the base station 10*a* as −20 dbm+(−30 dbm)=−50 dbm. Meanwhile, the terminal 40 calculates the received power from the base station 10*b* as −30 dbm+0 dbm=−30 dbm. As a result, for the time when performing connection via the slice 3, the received power from the base station 10*a* including the offset becomes weaker than the received power from the base station 10*b* including the offset. Then, the connection mode deciding unit 53 in the terminal 40 decides the connection destination in the case of performing connection via the slice 3 as the base station 10*b*.

The connection mode deciding unit 53 transmits a connection request to the connection destination that has been decided, via the transmitter 42 (Step S124). The processes after the request is made from the terminal 40 are similar to those in the first embodiment. Accordingly, the terminal 40 is able to connect to the base station 10*b* that is available for establishing a new connection using the slice 3, instead of the base station 10*a* in which resources of the slice 3 have been depleted.

Meanwhile, in the example in FIG. 18, a case in which resources have been depleted was explained as an example, but the base station 10 may also transmit, when a predetermined proportion or more of resources of a slice is used, information for making it less likely, regarding that slice, for the base station 10 to be selected as the connection destination.

FIG. 19 is a diagram illustrating an example of information used in the third embodiment. A table T1 is an example of the reporting of the offset. While in the example in FIG. 18, in order to facilitate understanding, an example was explained in which an offset regarding one slice was reported by the reporting information, but offsets for of a plurality of slices may be included in the reporting information. For example, it is assumed that in the base station 10*a*, resources of the slice 1 are not used, and resources of the slice 2 are used to some extent. Further, it is assumed that resources of the slice 3 have been depleted. In this case, it is assumed that, as presented in the table T1, the reporting unit 22 in the base station 10*a* sets the offset for the slice 1 to 0 dbm, the offset for the slice 2 to −10 dbm, and the offset of the slice 3 to −50 dbm. The reporting unit 22 of the base station 10*a* includes and transmits the information of the table T1 in the reporting information.

In this case, the terminal 40 that is going to connect to the slice 2 sets the received power for the base station 10*a* lower by 10 dbm than the actual measurement value. For example, if the actual measurement value from the base station 10*a* at the terminal 40 is −90 dbm, the terminal 40 that is going to connect to the slice 2 estimates the received power from the base station 10*a* as −100 dbm. In a similar manner, the terminal 40 that is going to connect to the slice 3 sets the received power for the base station 10*a* lower by 50 dbm than the actual measurement value. For example, if the actual measurement value from the base station 10*a* at the terminal 40 is −90 dbm, the terminal 40 that is going to connect to the slice 3 estimates the received power from the base station 10*a* as −140 dbm. After that, the terminal 40 uses the received power including the offset in deciding the connection destination, and therefore, a base station 10 having a larger excess portion of resources is preferentially selected as the connection destination.

While a case in which information is transmitted using reporting information according to the usage situation of resources was explained using FIG. 18, information for performing the selection of the base station 10 in accordance with the usage condition of the resources may be transmitted by means of other control signals. For example, an event may also be reported for making base stations shift more likely by means of ReportConfig of the LTE or the like.

A table T2 presents an example of information used in a case in which a handover (HO) event is reported. In the example of the table T2, the identifier of an adjacent cell and an event are set, for each slice. For example, it is assumed that the cell formed by the base station 10*a* is A, and the adjacent cell of A is B. Further, it is assumed that the cell B is formed by the base station 10*b*. The reporting unit 22 in the base station 10*a* sets an event with a different level of easiness to perform handover, according to the replenishment condition of resources of each slice. In the example of the table T2, for the slice 3 where resources have already been depleted, an event with which handover is difficult is set, for the slice 2 where a certain amount of resources are used, a normal event, and for the slice 1 where resources are not used, an event which handover is easy. Here, in a case in which the handover is to be suppressed, in the terminal 40, the threshold power used for the determination as to whether the adjacent cell is to be reported by means of Measurement Report or the like as a candidate for the handover target is set to a very high value. Meanwhile, in a case in which handover is to be accelerated, the threshold power used for the determination as to whether the adjacent cell is to be reported using Measurement Report or the like as a candidate for the handover target is set to a very low value. The reporting unit 22 reports the set information to the terminal 40 by means of ReportConfig or the like.

The available slice determining unit 51 in the terminal 40 includes, in the available slice information 61, the reported information of the table T2 reported by the Report Config. The connection mode deciding unit 53 makes a handover process occur as is appropriate, according to the slice being connected. For example, in a case in which the terminal 40 is connecting to the base station 10a using the slice 3, the connection mode deciding unit 53 executes, with respect to the base station 10b that forms the adjacent cell B, a process for performing a handover. Meanwhile, in a case in which the terminal 40 is connecting to the base station 10a using the slice 1, the connection mode deciding unit 53 does not execute a process for performing handover.

As described above, in the third embodiment, it is possible to prompt the terminal 40 to connect to another base station 10 according to the usage condition of resources, and therefore, the usage efficiency of resources in the system as a whole is further improved.

Fourth Embodiment

In the fourth embodiment, processing is explained in a case in which each base station 10 changes the distribution of resources according to the usage condition of resources in a nearby base station 10.

Figure 20:
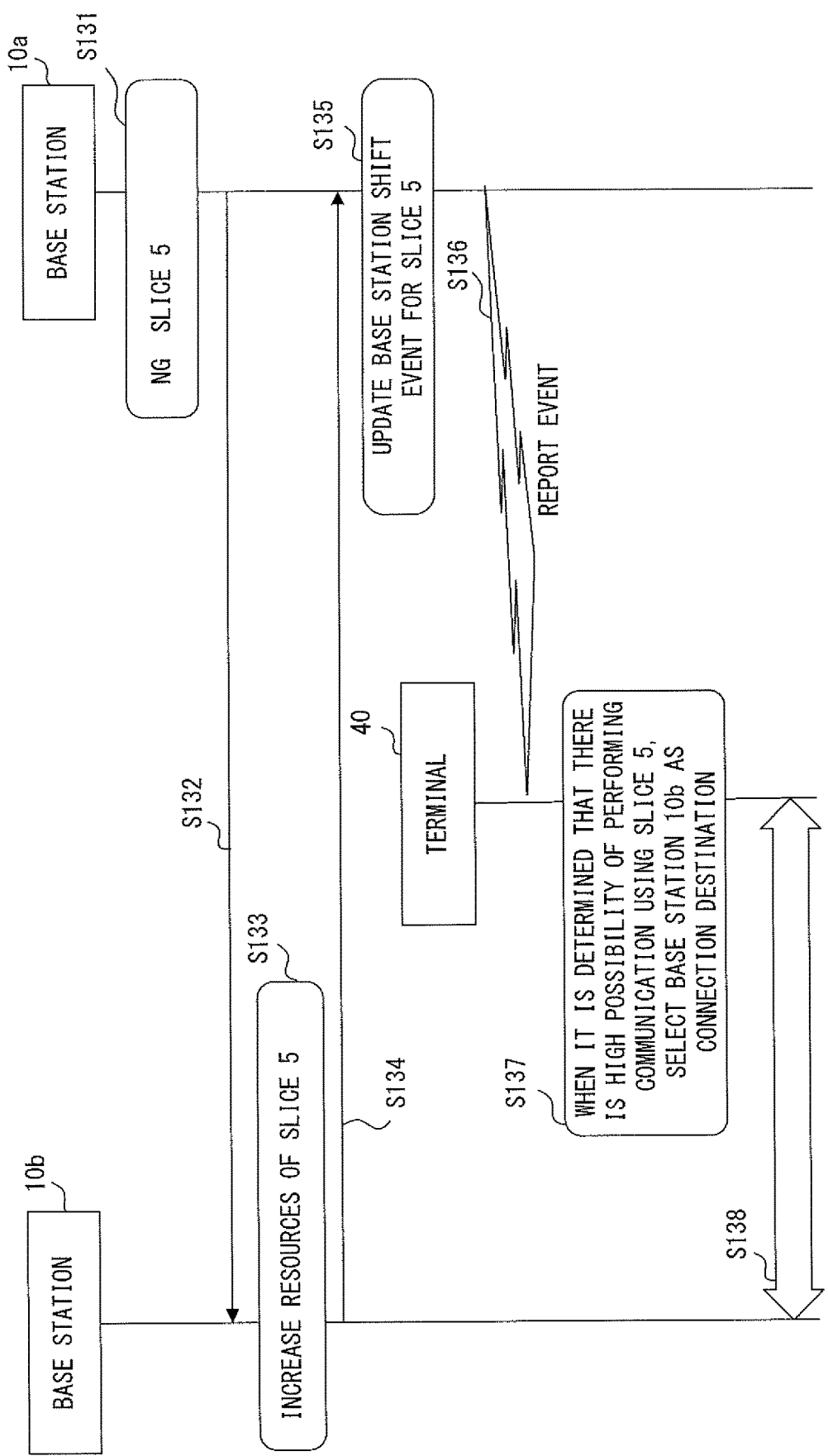
FIG. 20 is a sequence diagram illustrating a communication method according to the fourth embodiment.

FIG. 20 is a sequence diagram illustrating the communication method according to the fourth embodiment. In FIG. 20, it is assumed that a base station 10a and a base station 10b are included in the system as well. Meanwhile, in the explanation below, in order to clarify the base station 10 that is executing the operation, an alphabet assigned to the base station 10 that is executing the operation may be presented at the end of the numerals. For example, the communicating unit 12a is the communicating unit 12 in the base station 10a.

It is assumed that, in the base station 10a, resources of the slice 5 become depleted (Step S131). Then, the communicating unit 12a notifies the base station 10b that, in the base station 10a, resources of the slice 5 have been depleted (Step S132).

upon receiving the notification from the base station 10a, the communicating unit 12b of the base station 10b reports the obtained information to the allocation processing unit 24b. The allocation processing unit 24b refers to the available slice information 61b to obtain the usage condition of resources in the base station 10b and determines whether it is possible to increase resources allocated to the slice 5. In the example in FIG. 20, it is assumed that the allocation processing unit 24b determines that it is possible to increase resources allocated to the slice 5. Then, the allocation processing unit 24b cancels the setting of allocation of unused resources to other slices and also allocates, to the slice 5, the resources for which the setting has been cancelled, thereby increasing resources of the slice (Step S133). When the allocation process by the allocation processing unit 24b is finished, the communicating unit 12b notifies the communicating unit 12a in the base station 10a that resources for the slice 5 have been increased (Step S134).

The communicating unit 12a notifies the reporting unit 22a that resources of the slice 5 have been increased in the base station 10b. Then, the reporting unit 22a generates an event that would make it easy for the terminal 40 performing communication using the slice 5 to perform a handover to the base station 10b and reports it to the terminal 40 by means of ReportConfig or the (Steps S135, S136).

The available slice determining unit 51 in the terminal 40 records, in the available slice information 61, the information reported from the base station 10a. After that, in a case in which is it determined that there is a high possibility of performing communication using the slice 5, or in a case in which communication is being performed using the slice 5, the connection mode deciding unit 53 selects the base station 10b as the connection destination (Step S137). The connection mode deciding unit 53 performs inter-cell shift from the sell formed by the base station 10a to the cell formed by the base station 10b, by performing a handover to the base station 10b (Step S138).

In the fourth embodiment, it is possible to change, according to the usage condition of resources in a nearby base station 10, the amount of resources that another base station include in each slice. Furthermore, after the change of the amount of resource allocation, a base station 10 in which resources have been depleted is able to prompt the terminal 40 to connect to another base station 10. Therefore, the usage efficiency of resources in the system as a whole is further improved.

Meanwhile, in the example in FIG. 20, a case in which resources have been depleted was explained as an example, but the base station 10 may also transmit, when a predetermined proportion or more of resources of a slice is used, information for making it less likely, regarding this slice, for the base station 10 to be selected as the connection destination.

<Others>

Meanwhile, embodiments are not limited to the ones described above and may be changed in various ways. Some examples are described below.

For example, the tables and the like described in the explanations above are an example, and information elements included in the tables may be changed according to the implementation.

In the fourth embodiment, the base station 10 is able to understand the usage condition of resources of adjacent cells, and therefore, for each of a plurality of adjacent cells, an event for each slice may be set and reported. For example, it is assumed that the adjacent cell A has sufficient resources in the slice 3, but in the adjacent cell B, resources in the slice 3 are becoming insufficient. In this case, the base station 10 sets, for the adjacent cell A, an event that is easy for the terminal 40 performing communication using the slice 3 to hand over, but sets, for the adjacent cell B, an event that is difficult for the terminal 40 performing communication using the slice 3 to hand over.

In addition, the third embodiment and the fourth embodiment may be used in combination.

In any embodiment, slices set in the base station 10 may be physically identified by frequency, by F-OFDMA (filtered orthogonal frequency division multiple access) or the like. Meanwhile, in any embodiment, slices set in the base station 10 may be logically set, without any physical constraints by frequency or the like.

As described above, the base station according to the embodiments is able to recognize the quality of communication that a terminal is going to use.

All examples and conditional language provided herein are intended for the pedagogical purposes of aiding the reader in understanding the invention and the concepts contributed by the inventor to further the art, and are Not to be construed as limitations to such specifically recited examples and conditions, Nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station device comprising:
a transmitter configured to transmit reporting information including information of divided resources obtained by dividing resources in association with services provided via a co network, information of connection modes used when connecting to the divided resources, and information for identifying services associated with the divided resources;
a receiver configured to receive, from a terminal device that has received the reporting information, a connection request that specifies a certain connection mode selected from the connection modes indicated by the reporting information; and
a processor configured to generate notification information for making a certain terminal device reduce a priority of the base station device as a connection destination, the certain terminal device performing connection using a certain divided resource in which a predetermined proportion or more is used for a process of allocation to the terminal device communicating with the base station device,
wherein the transmitter transmits the notification information.

2. The base station device according to claim 1, further comprising a processor configured to establish connection with the terminal device that is a transmission source of the connection request, by allocating one of the divided resources associated with the certain connection mode specified by the connection request.

3. The base station device according to claim 1, wherein as information for identifying the services associated with the divided resources, information representing communication qualities obtained when connecting to the divided resources is included in the reporting information.

4. The base station device according to claim 1, further comprising a transmission path interface configured to perform communication with another base station device, wherein
the transmission path interface transmits a notification that requests the other base station device to increase the certain divided resource in the other base station device that have a same communication quality with the certain divided resource in which the predetermined proportion or more is used, and
upon receiving notification from the other base station device that the certain divided resource specified by the notification has been increased, the processor generates the notification information including information prompting the certain terminal device to connect to the other base station device.

5. A communication system comprising:
a terminal device configured to use services provided by devices in a core network; and
a base station device configured to:
transmit reporting information including information of divided resources obtained by dividing resources in association with the services, information of connection modes used when connecting to the divided resources, and information for identifying services associated with the divided resources; and
receive a connection request from the terminal device,
wherein upon receiving the reporting information, the terminal device selects a certain connection mode from the connection modes indicated by the reporting information and transmits the connection request that specifies the certain connection mode; and
the base station further comprising a processor configured to generate notification information for making the terminal device reduce a priority of the base station device as a connection destination, the terminal device performing connection using the divided resource in which a predetermined proportion or more is used for a process of allocation to the terminal device communicating with the base station device.

* * * * *